US006016133A

United States Patent [19]

Nito et al.

[11] Patent Number: 6,016,133
[45] Date of Patent: *Jan. 18, 2000

[54] PASSIVE MATRIX ADDRESSED LCD PULSE MODULATED DRIVE METHOD WITH PIXEL AREA AND/OR TIME INTEGRATION METHOD TO PRODUCE CORAY SCALE

[75] Inventors: Keiichi Nito; Akio Yasuda, both of Tokyo; Hidehiko Takanashi, Kanagawa; Ying Bao Yang, Saitama, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/347,245

[22] Filed: Nov. 23, 1994

[30] Foreign Application Priority Data

Nov. 30, 1993 [JP] Japan .................................... 5-325850

[51] Int. Cl.[7] .............................. G09G 3/36; G09G 5/10; C09K 19/02

[52] U.S. Cl. ............................ 345/89; 345/148; 349/172; 349/182

[58] Field of Search ................................. 345/89, 94, 97, 345/100, 147, 148, 149; 349/33, 84, 86, 132, 89, 173, 172, 182; 252/299.01

[56] References Cited

U.S. PATENT DOCUMENTS

| | | | |
|---|---|---|---|
| 4,773,716 | 9/1988 | Nakanowatari | 345/97 |
| 4,986,638 | 1/1991 | Yamazaki et al. | 349/133 |
| 5,151,803 | 9/1992 | Wakita et al. | 345/97 |
| 5,214,523 | 5/1993 | Nito et al. | 349/173 |
| 5,250,932 | 10/1993 | Yoshimoto et al. | 349/86 |
| 5,305,126 | 4/1994 | Kobayashi et al. | 349/86 |
| 5,321,533 | 6/1994 | Kumar | 349/86 |
| 5,459,495 | 10/1995 | Scheffen et al. | 345/147 |
| 5,475,517 | 12/1995 | Konuma et al. | 349/132 |
| 5,485,173 | 1/1996 | Scheffen et al. | 345/100 |
| 5,499,037 | 3/1996 | Nakagawa et al. | 345/89 |
| 5,548,302 | 8/1996 | Kuwata et al. | 345/89 |
| 5,571,450 | 11/1996 | Yasuda et al. | 252/299.61 |
| 5,594,466 | 1/1997 | Yamamoto et al. | 345/94 |
| 5,620,630 | 4/1997 | Onishi et al. | 349/89 |

*Primary Examiner*—Jeffery Brier
*Assistant Examiner*—Paul A. Bell
*Attorney, Agent, or Firm*—Hill & Simpson

[57] ABSTRACT

A method of driving a liquid crystal device, which comprises matrix-addressed driving a liquid crystal device comprising a liquid crystal, particularly a ferroelectric liquid crystal, disposed between a pair of substrates and comprising finely distributed domains differing in threshold voltage for use in switching said liquid crystal, said method being a pulse modulation method comprising modulating at least one of pulse voltage and pulse width, a pixel electrode division method, or a time integration method. Also claimed is a liquid crystal device driven by any of said methods. The liquid crystal device provides a further improved analog multiple gray-scale level display, realizes a large-area display at a low cost, and enables drive at full color video rate.

16 Claims, 29 Drawing Sheets

Structure of a direct X-Y matrix panel scanning waveform and signal waveform

Threshold characteristics of ferroelectric liquid crystal $$d1 + d2 = dgap$$

$$Eeff = \frac{\varepsilon_2}{\varepsilon_1 d_2 + \varepsilon_2 d_1} \times Vgap \quad \text{-------} \quad (1)$$

ε1 : dielectric constant of liquid crystal

ε2 : dielectric constant of fine grains added into lequid crystal

SPECIFIC EXAMPLE FOR DIVIDING AN ELECTRODE INTO THREE PORTIONS AT AN AREA RATIO OF $1:2^1:2^2$ (PROVIDED A DISPLAY WITH 8-GRAY-SCALE LEVELS)

AN EXAMPLE OF COMBINING TIME INTEGRATION METHOD WITH A LIQUID CRYSTAL DEVICE HAVING STARLIGHT TEXTURE waveform of data voltage AN EXAMPLE OF DISPLAY OBTAINED BY APPLYING THE DATA VOLTAGE HAVING THE WAVEFORM OF FIG. 22

GRAY-SCALE LEVELS AND MULTIPLICITY IN DIVIDING AN ELECTRODE AT AN AREA RATIO OF $2^n$SERIES (15 GRAY-SCALE LEVELS)

SPECIFIC EXAMPLE FOR DIVIDING AN ELECTRODE INTO THOSE POSITIONS AT AN AREA RATIO OF $1:3^1:3^2$ (8 GRAY-SCALE LEVELS)

GRAY-SCALE LEVELS AND MULTIPLICITY IN DIVIDING AN ELECTRODE AT AN AREA RATIO OF $3^n$ SERIES (27 GRAY-SCALE LEVELS)

(CONVENTIONAL DEVICE)

(CONVENTIONAL DEVICE)

CONE MODEL OF A FERROELECTRIC LIQUID CRYSTAL (CONVENTIONAL DEVICE)

Threshold charactersties of a ferroelectric liquid crystal

PASSIVE MATRIX ADDRESSED LCD PULSE MODULATED DRIVE METHOD WITH PIXEL AREA AND/OR TIME INTEGRATION METHOD TO PRODUCE CORAY SCALE

BACKGROUND OF THE INVENTION

The present invention relates to a method of driving a liquid crystal device comprising a liquid crystal material disposed between a pair of substrates opposed to each other. More particularly, the present invention relates to a method of driving a liquid crystal device comprising a ferroelectric liquid crystal disposed between a pair of substrates opposed to each other, said substrates spaced at a predetermined distance from each other and each provided with a transparent electrode and an alignment film formed in this order. The present invention further relates to a liquid crystal device driven by said method.

A twisted nematic (TN) liquid crystal device commercially available at present is driven by active-matrix addressing utilizing thin film transistors (TFTs), and it provides gray scale images. However, the poor product yield and the high process cost in the fabrication of the TFTs are still great problems to be overcome in developing large area display devices.

In contrast to the aforementioned TN liquid crystal devices, those utilizing surface stabilized bistable (SSB) ferroelectric liquid crystals (hereinafter sometimes referred to simply as "FLCs") obviate the need for an external active-matrix addressing driver such as TFTs. Hence, they have attracted much attention from the viewpoint of their potential application to a low cost large-area display device.

Active research and development concerning the application of FLCs to display devices have been undertaken these ten years. FLC displays are superior to other liquid crystal displays, mainly because of the following attributes:

(1) High speed. The electro-optical response of an FLC display is so quick that it yields a speed 1,000 times as fast as that of a conventional nematic liquid crystal display;

(2) Wide viewing angle. An FLC display provides a stable image less influenced by the viewing angle; and (3) Memory effect. The bistability of an FLC device excludes the need of an electronic or other memory for maintaining an image.

Considering a conventional display technique using a ferroelectric liquid crystal disclosed in U.S. Pat. No. 4,367,924 by Clark et al., there is proposed a surface stabilized FLC display device comprising liquid crystal molecules disposed in a panel comprising two flat plates treated to enforce molecular alignment parallel to the plates. The plates are spaced at a distance of 2 $\mu$m or less to ensure the liquid crystal material to form two stable states of the alignment field. The quick response of the display in the order of microseconds and the memory effect of maintaining the image have been the subject of intensive research and development.

As described in the foregoing, a bistable mode FLC display is characterized in that it has the following attributes: (1) Flicker-free. The problem of flickers in cathode ray tubes (CRTs) can be overcome by the memory effect of the FLC. (2) Excellent driveability using 1,000 or more scanning lines even in a direct X-Y matrix drive. The FLC display can be driven without using any TFTs. (3) Wide range in viewing angle. Because of the uniform molecular alignment and the use of a narrow-gap liquid crystal panel spaced at a gap corresponding to a half or less of that of a conventional nematic liquid crystal panel, an FLC display can be viewed from over a wider range as compared with the problematic narrow viewing angle of nematic liquid crystal displays which are now prevailing in practical application.

Referring to a schematically illustrated structure in FIG. 28, an FLC display is described below. An FLC display comprises a laminate A composed of a transparent substrate la such as a glass substrate having, in this order thereon, a transparent electrode layer 2*a* fabricated with an ITO (indium tin oxide; a tin-doped electrically conductive oxide comprising indium) and a liquid crystal alignment sheet 3*a* fabricated with an obliquely vapor-deposited SiO layer; and a laminate B having a structure similar to that of the laminate A but comprising a substrate 1*b* provided thereon a transparent electrode layer 2*b* and an obliquely vapor-deposited SiO layer 3*b* in this order, provided that the laminates A and B are disposed opposed to each other with a spacer 4 incorporated therebetween to maintain a predetermined cell gap, and in such a manner that the liquid crystal alignment sheets, e.g., the obliquely vapor-deposited SiO layers 3*a* and 3*b*, may be opposed to each other. A ferroelectric liquid crystal 5 is then injected into the cell gap between the two laminates A and B.

The FLC displays fabricated in this manner are certainly superior considering the aforementioned characteristics. However, there still is a serious problem to be overcome in realizing displays having sufficient gray scale levels. That is, a conventional bistable FLC display is realized by switching between two stable states, and is therefore considered unsuitable for use in multiple gray scale-level displays such as video displays.

More specifically, in a conventional FLC device (e.g., a surface stabilized FLC device) as illustrated in FIG. 29, the direction of the molecular alignment of a molecule M is switched between two stable states, i.e., state 1 and state 2, by reversing the polarity of an externally applied electric field E. By placing the liquid crystal panel between two crossed polarizers, the change in the molecular alignment can be discerned as a change in transmittance. This is illustrated in the graph of FIG. 30, in which a steep rise in transmittance from 0% to 100% is observed to occur at the threshold voltage $V_{th}$ with increasing applied electric field. This abrupt change occurs generally within a voltage width of 1 V or less. Furthermore, the threshold voltage $V_{th}$ depends on the minute fluctuation of the cell gap. Thus, in a conventional liquid crystal device, it can be seen that the transmittance vs. applied voltage curve cannot be set stably within a predetermined voltage range, and that it is extremely difficult or even impossible to realize a gray scale display by simply controlling the applied voltage.

Accordingly, there is proposed an area-modified multi-level gray-scale method (referred to simply hereinafter as an "area multi-gray-level method) which comprises setting the gray scale levels by adjusting the pixel area using sub-pixels or by dividing a pixel electrode into a plurality of portions. There is also proposed a time integration multi-gray-level method which comprises repeatedly applying switching or line addressing within a single field by taking advantage of the fast switching nature of the ferroelectric liquid crystal. However, these newly proposed methods are found still insufficient for a successful multiple gray-level display.

More specifically, in the area multi-gray-level method, the number of sub-pixels increases with increasing number of gray scale levels. It can be readily understood that this method is disadvantageous from the viewpoint of cost to performance ratio concerning the process of device fabrication and the drive method. The time integration method, on the other hand, is practically unfeasible when used alone, and is still practically inferior even when it is used in combination with the area multi-gray-level method.

In the light of the aforementioned circumstances, there is proposed a method which comprises implementing an analog multiple gray-scale level display pixel by pixel. This is realized by locally generating a gradient in the intensity of electric field; more specifically, gray-level display according to the method can be realized by changing the distance between the opposed electrodes within a single pixel, or by changing the thickness of the dielectric layer formed between the opposed electrodes. Otherwise, a potential gradient is provided by using different materials for the opposed electrodes.

Still, however, the fabrication of a practically feasible liquid crystal device capable of displaying an analog multiple gray-scale level image accompanies complicated process steps, and, moreover, it requires a strict control of the fabrication conditions. It can be seen therefore that the cost of fabrication thereby is greatly increased.

Another FLC display device for gray scale display is proposed in JP-A-3-276126 (the term “JP-A-” as referred herein signifies “unexamined published Japanese patent application”). The FLC display device comprises an alignment sheet on which, for example, fine-grained alumina composed of grains from 0.2 to 2 μm in size is dispersed. The switching of the ferroelectric liquid crystal is controlled by adjusting the voltage applied to the portion in which the fine grains are present and that applied to the portion comprising no fine grains. A gray scale display is implemented in this manner.

However, the prior art technology above is of no practical use, because the fine grains used therein are too large in particle size, and because the quantity of the dispersed grains is not clearly stated. Thus, in practice, the designed gray scale display cannot be implemented by following the disclosed technology.

More specifically, for instance, it is greatly difficult to finely reverse the liquid crystal molecules within a single pixel by simply dispersing fine grains from 0.3 to 2 μm in size in a cell having a gap of 2 μm. Moreover, the control of a cell gap in an FLC display is extremely difficult because the FLC display itself utilizes the birefringence mode of the liquid crystal. The failure in strict control of the cell gap results in an uneven coloring. Thus, the technological requirement for the cell above is assumably the same as that for a super-twisted nematic (STN) display device in which the fluctuation in cell gap must be controlled within 500 Å.

SUMMARY OF THE INVENTION

In the light of the aforementioned circumstances, the present invention aims to overcome the technological problems of the prior art technology. Hence, an object of the present invention is to provide a liquid crystal device, particularly a ferroelectric liquid crystal device, which surely and easily realizes a passive-matrix addressed analog multiple gray-scale level display, and yet, at a low cost.

The above object is accomplished in one aspect by a method of driving a liquid crystal device according to an embodiment of the present invention, which comprises matrix-addressed driving (particularly, direct X-Y matrix-addressed driving) a liquid crystal device comprising a liquid crystal (particularly an FLC) disposed between a pair of substrates and comprising finely distributed domains differing in threshold voltage to be used in switching said liquid crystal, wherein, the application of a data signal to a data electrode, said data signal having its pulse voltage or pulse width or both of the pulse voltage and pulse width are modulated in correspondence with the gray scale of the pixel, is synchronized with the application of an addressing signal to a scanning electrode.

According to another embodiment of the present invention, there is provided a method of driving a liquid crystal device which comprises matrix-addressed driving (particularly direct X-Y matrix-addressed driving) a liquid crystal device above, wherein, the data electrodes constituting a single pixel are divided into a plurality of portions differing in area from each other, and a combination of data signals (pulsed voltage) corresponding to the gray scale of the pixel is applied to said divided plurality of data electrode portion in synchronism with the application of an addressing signal to a scanning electrode. This method of driving a liquid crystal device is referred to sometimes hereinafter as a “pixel electrode division method” or an “area multi-gray-level method”.

According to a still other embodiment of the present invention, there is provided a method of driving a liquid crystal device which comprises matrix-addressed driving a liquid crystal device above, wherein, a time-averaged gray scale display is realized by the time integration method comprising repeating a plurality of line addressing per single pixel within a single frame or single field in correspondence with the gray scale of the pixel. More specifically, the gray scale display is obtained in correspondence with the time-averaged frequency of flickers within a single frame or a single field. If desired, at least one of the pulse voltage and the pulse width can be modulated according to the gray scale levels.

The liquid crystal device which is driven by the method according to the present invention may comprise a pair of substrates disposed opposed to each other with a ferroelectric liquid crystal incorporated therebetween and said pair of substrates each having thereon a clear electrode and an alignment film thereon in this order. The term “liquid crystal comprising finely distributed domains differing in threshold voltage” in the description of the liquid crystal signifies that the liquid crystal comprises reversed domains (for instance, white domains in black matrix or vice versa) which yield a transmittance of 25% when 300 or more (preferably, 600 or more) of said domains (micro-domains) 2 μm or more in diameter being distributed in a viewing area of 1 $mm^2$, and that a single domain has a threshold voltage which ranges over 2 volts or more in correspondence with the change in transmittance of from 10 to 90%.

As exemplified in the graph of FIG. 10, the liquid crystal device driven by a method according to the present invention does not yield an abrupt change in transmittance with increasing applied voltage. This is in clear contrast with a transmittance vs. applied voltage curve illustrated in FIG. 30 for a typical conventional method of driving a liquid crystal device, in which the transmittance is observed to rise rapidly at the threshold voltage with increasing applied voltage. It can be seen from the foregoing that the gradual change in transmittance in the liquid crystal device according to the present invention is ascribed to the change in transmittance within the individual fine domains (micro-domains) differing in threshold voltage ($V_{th}$) that are formed within a pixel. An analog multiple gray-scale level display can be thus obtained by constituting the liquid crystal device from pixels each composed of a plurality of domains differing in threshold voltage and having a size in the order of micrometers, and furnishing each of the domains with bistable liquid crystal molecules which exhibit a memory function and which thereby realize a flicker-free still image in the domain.

Referring to the graph in FIG. 10, the threshold voltage corresponding to a transmittance of 10% is referred to as $V_{th1}$, and that corresponding to a transmittance of 90% is referred to as $V_{th2}$. Thus, the difference in threshold voltage ($\Delta V_{th}=V_{th2}-V_{th1}$) is found to be 2 V or more.

Referring to FIG. 11(A), micro-domains MD having a diameter of 2 μm or larger must be present for 300 or more per area of 1 $mm^2$ of the liquid crystal at a transmittance of 25%. A display having an intermediate gray level (transmittance) can be realized in this manner by providing the fine light-transmitting portions utilizing the micro-domains. These micro-domains exhibit a so-called starlight sky-like texture. Accordingly, the texture resulting from the micro-domains are referred to simply hereinafter as a "starlight texture".

In a liquid crystal exhibiting the starlight texture, the light-transmitting portions MD corresponding to the micro-domains can be expanded or reduced as illustrated with the dashed line in FIG. 11(A) by increasing or decreasing the applied voltage. That is, the transmittance can be changed freely by increasing or decreasing the voltage to accordingly increase or lower the transmittance. In contrast to the liquid crystal device according to the present invention, the light transmittance of a conventional liquid crystal device rapidly changes in a narrow range of threshold voltage as is illustrated in FIG. 11(B). This signifies that the light-transmitting portion D in the structure of a conventional liquid crystal device rapidly increases or diminishes upon applying a voltage, thus making it extremely difficult to realize a gray scale display.

In a liquid crystal device according to the present invention, the aforementioned micro-domains can be formed by means of dispersing super-fine grains within the liquid crystal. An FLC display device comprising super-fine grains 10 dispersed in the liquid crystal material is illustrated in FIG. 10. The basic structure is the same as that shown in FIG. 28.

Referring to FIG. 13, the reason why a change in threshold voltage induced by incorporating the super-fine grains 10 is explained below. By principle, the electric field $E_{eff}$ applied to the super-fine grains can be expressed by the following equation:

$$E_{eff}=\left(\frac{\varepsilon_2}{(\varepsilon_1 d_2+\varepsilon_2 d_1)}\right)\times V_{gap}$$

where, $d_2$ and $\epsilon_2$ each represent the grain diameter and the dielectric constant of a super-fine grain 10, and $d_1$ and $\epsilon_1$ each represent the thickness and the dielectric constant of the liquid crystal exclusive of the super-fine grain 10.

Thus, it can be seen that if super-fine grains having a dielectric constant lower than that of the liquid crystal ($\epsilon_2<\epsilon_1$) are incorporated into the liquid crystal layer, it results to yield an $E_{eff}$ smaller than $E_{gap}$:

$$E_{eff}<E_{gap}$$

where $E_{gap}$ represents the electric field of the liquid crystal layer with no fine grains incorporated therein, because fine grains having a diameter of $d_2$ smaller than the total thickness of the liquid crystal layer $d_{gap}$ ($=d_1+d_2$) are incorporated into the liquid crystal layer. If fin grains having a dielectric constant higher than that of the liquid crystal ($\epsilon_2>\epsilon_1$), on the contrary, an electric field larger than that functioning on a liquid crystal layer having no fine grains therein results to the liquid crystal layer containing the fine grains:

$$E_{eff}>E_{gap}.$$

Briefly, the effective field $E_{eff}$ to the liquid crystal changes depending on the dielectric constant of the super-fine grains incorporated into the liquid crystal layer as follows:

(1) when $\epsilon_2$ is larger than $\epsilon_1$ ($\epsilon_2>\epsilon_1$), $E_{eff}$ results larger than $E_{gap}$ ($E_{eff}>E_{gap}$), because $E_{gap}$ can be expressed by $$E_{gap}=V_{gap}/d_{gap}=V_{gap}/(d_1+d_2);$$

(2) when $\epsilon_2$ equal to $\epsilon_1$ ($\epsilon_2=\epsilon_1$), $E_{eff}$ is also equal to $E_{gap}$ ($E_{eff}=E_{gap}$); and (3) when $\epsilon_2$ is smaller than $\epsilon_1$ ($\epsilon_2<\epsilon_1$), $E_{eff}$ results smaller than $E_{gap}$ ($E_{eff}<E_{gap}$).

At any rate, the effective electric field $E_{eff}$ applied to the liquid crystal itself changes by the incorporation of super-fine grains. Accordingly, the effective electric field applied to a portion in which the super-fine grains are incorporated differs from that applied to a portion containing no super-fine grains therein. Conclusively, even if a same electric field $E_{gap}$ were to be applied to the liquid crystal layer, a starlight texture as illustrated in FIG. 11(A) can be obtained as a result of the presence of a region in which a reversed domain generate in accordance with the applied electric field.

It can be seen from the foregoing that the liquid crystal device having the starlight texture according to the present invention can favorably realize a display with continuous gray scale. More specifically, the transmittance of a liquid crystal in which super-fine grains are added can be varied as desired by controlling the intensity, pulse width, and other attributes of the applied voltage. That is, more than two gray scale levels can be obtained by applying two or more types of voltage. In contrast to the liquid crystal device having the starlight texture according to the present invention, a conventional liquid crystal device simply comprising fine grains therein results in a texture as illustrated in FIG. 11(B). In particular, it is obvious that a desired display performance cannot be obtained by simply dispersing fine grains from 0.3 to 2 μm in diameter within a cell spaced at such a small gap of about 2 μm. Even if a larger spacing were to be taken for the cell, the liquid crystal cell would suffer uneven coloring due to the presence of the portion containing fine grains. This phenomena is explained in further detail hereinafter. The liquid crystal device according to the present invention is completely free of such unfavorable phenomena and exhibits the desired performance.

Thus, the present invention provides a liquid crystal device which is capable of producing the aforementioned starlight texture. In particular, the present invention provides a liquid crystal display which is suitable for passive-matrix addressed drive and which realizes a large area display device at low cost, in which a multiple gray-scale level display is further improved by applying any of the aforementioned drive methods inclusive of pulse modulation, pixel electrode division, and time integration. Furthermore, the liquid crystal display device according to the present invention can be driven at full-color video rate.

The analog gray scale of the liquid crystal device having the starlight texture above can be implemented surely and in various manners by modulating the data signal in accordance with the gray scale of the pixel and applying the thus modulated signal to the data electrode according to the method of driving the liquid crystal device of the present invention. More specifically, the method of driving a liquid crystal device according to the present invention can be realized in one aspect by dividing the pixel electrode into a plurality of portions differing in area ratio from each other, and thereby applying the data signals corresponding to the gray scale of the pixel.

The method of driving a liquid crystal device according to the present invention can be accomplished in another aspect by repeatedly line-addressing (writing data signals) each of the pixels according to the gray scale of the pixel within a single frame or single field.

The liquid crystal device for use i n the present invention is capable of passive-matrix addressed drive without using any electronic devices such as TFTs, and can be provided at low cost as a large-area display device.

In the liquid crystal device for use in the present invention as illustrated in FIG. 12, the fine grains to be added into the liquid crystal are not particularly limited so long as they are capable of providing a distribution to the effective electric field applied to the liquid crystal 5 incorporated between the transparent electrode layers 2*a* and 2*b* opposed to each other. For instance, the fine grains may be a mixture comprising a plurality of types of grains differing in material and dielectric constant. In this manner, a distribution in dielectric constant can be established within each of the pixels. Thus, as described in the foregoing, even when a uniform external electric field is applied between the transparent electrode layers 2*a* and 2*b* of a pixel, an effective electric field having a distribution in intensity can be applied to the liquid crystal inside the pixel. An analog gray scale display within a pixel can be thus realized by expanding the range of the threshold voltage for switching the liquid crystal (particularly, an FLC) between the bistable states.

In case the fine grains are made from a material having the same dielectric constant, the size thereof may be distributed. The use of fine grains differing in size instead of those having a difference in dielectric constant provides a distribution in the thickness of the liquid crystal layer. Similarly to the case using fine grains differing in dielectric constant, a distribution in the intensity of the effective electric field applied to the liquid crystal layer can be developed within the pixel even when a uniform external electric field is applied between the opposing transparent electrode layers 2*a* and 2*b* provided to the pixel. An analog multiple gray-scale level display can be realized in this manner. Fine grains having a size distribution over a wide range is preferred from the viewpoint of achieving a superior analog multiple gray-scale level display.

Preferably in the liquid crystal device according to the present invention, the fine grains to be added into the liquid crystal have a surface with a pH value of 2.0 or higher. Fine grains having a pH value lower than 2.0 are too acidic, and the protons thereof may become the cause of the degradation of the liquid crystal.

Preferably, the fine grains are added into the liquid crystal at a quantity of from 0.1 to 50% by weight of the liquid crystal. If the fine grains are added in excess, they may form an aggregate as to impair the starlight texture. The formation of such aggregates also impedes the injection of the liquid crystal.

Fine grains usable in the liquid crystal device according to the present invention may be those of at least one selected from carbon black and titanium oxide. Carbon black prepared by furnace process is particularly preferred. Similarly, particularly preferred is amorphous titanium oxide. Fine grains of carbon black prepared by furnace process are preferred because they are distributed over a relatively wide range of particle size. Fine grains of amorphous titanium oxide are durable and have superior surface properties.

The usable fine grains are preferably, well-dispersed primary fine grains having a grain size corresponding to half the spacing of the liquid crystal cell or less. More specifically, the grain size thereof is preferably in the range of 0.4 μm or less, and particularly preferably, 0.1 μm or less. Preferably, the standard deviation of the particle size distribution of the fine grains is 9.0 nm or more. By thus controlling the particle size distribution, the gray scale display characteristics can be controlled more favorably because a gradual change in transmittance can be set in accordance with the applied voltage. Preferably, the specific gravity of the fine grains are in the range of from 0.1 to 10 times that of the liquid crystal. By using fine grains having their specific gravity controlled within this range, the fine grains can be finely dispersed in the liquid crystal without being settled. Preferably, the fine grains are rendered highly dispersive by a surface-treatment using a silane coupling agent and the like.

The liquid crystal device according to the present invention comprises fine grains incorporated between the two opposing electrodes. However, the location of the fine grains is not particularly limited. Accordingly, the fine grains may be incorporated into the liquid crystal or the liquid crystal alignment sheet, or may be disposed on the liquid crystal alignment sheet.

According to an embodiment of the present invention, there is provided a method of driving a liquid crystal device by mutually combining the methods described hereinbefore. In case of driving the liquid crystal device using a combination of the previously described methods, the use of a liquid crystal device having a starlight texture is preferred. However, the method of driving a liquid crystal device is not only limited thereto, and a gray scale display can be realized without using the liquid crystal device having a starlight texture.

More specifically, the time integration multi-gray-level drive method can be combined with the method of driving a liquid crystal device using the aforementioned area multi-gray-level which comprises dividing the data electrode into specified portions. In the multiple gray-scale level drive method which results from the combination of the previously described methods of area multi-gray-level drive, the data electrode is preferably divided into portions as such to yield an area ratio of $1:(m+1):(m+1)^2: \ldots :(m+1)^{n-2}:(m+1)^{n-1}$, where, n represents the number of pixel portions obtained by dividing a single pixel, and m represents the repetition times of line addressing per single pixel within a single frame or single field. A further improved multiple gray-scale level display can be obtained by dividing the data electrode according to the preferred embodiment above.

According to a still other method of driving a liquid crystal device of the present invention, there is provided a method obtained by combining the aforementioned time integration multi-gray-level drive with the drive method of providing gray scale within a pixel in which a modulated data signal is applied in synchronism with the application of the addressing signal to the scanning electrode, said modulated data signal having either or both of the pulse voltage and pulse width modulated.

In the multiple gray-scale level drive method which results from the combination of the methods of multi-gray-level drive above, a maximum integer n, which satisfies a relation as such that either the linear gray scale number per single pixel is not less than $[(m+1)^{n-1}+1]$ or the non-linear gray scale number per single pixel is not less than n+1, is combined with the repetition times m of line addressing per single pixel in a single frame or single field, so that the transmittance per pixel may be controlled as such to yield a ratio of $1:(m+1)^1:(m+1)^2: \ldots :(m+1)^{n-2}:(m+1)^{n-1}$. A further improved gray scale display can thereby be obtained.

According to a yet other method of driving a liquid crystal device of the present invention, there is provided a method obtained by combining the aforementioned method of providing a gray scale within a single pixel with the area multi-gray-level drive. More specifically, the gray scale within a pixel is achieved by applying a modulated data signal in synchronism with the application of the addressing signal to the scanning electrode, said modulated data signal having either or both of the pulse voltage and pulse width modulated, whereas the area multi-gray-level drive is achieved by changing the area ratio of the data electrode constituting a single pixel, and by then applying a pulse voltage to the combination of the data electrodes corresponding to the gray scale of the single pixel in synchronism with the application of the addressing signal.

In the multiple gray-scale level drive method which results from the combination of the methods of multi-gray-level drive above, the number of gray scale l per single pixel which results from the modulated data signal and the number of division n of a data electrode constituting single pixel are preferably combined as such that the data electrode is divided into portions at an area ratio of $1:l^1:l^2:\ldots:l^{n-2}:l^{n-1}$. A further improved gray scale display can thereby be obtained.

According to a still yet other method of driving a liquid crystal device of the present invention, there is provided a method obtained by combining the aforementioned method of providing gray scale within a single pixel with the time integration multi-gray-level drive and the area multi-gray-level drive above. More specifically, the gray scale within a pixel is achieved by applying a modulated data signal in synchronism with the application of the addressing signal to the scanning electrode, said modulated data signal having either or both of the pulse voltage and pulse width modulated, and the area multi-gray-level drive is achieved by changing the area ratio of the data electrode constituting a single pixel, and then applying a pulse voltage to the combination of the data electrodes corresponding to the gray scale of the single pixel in synchronism with the application of the addressing signal.

In the multi-gray-level drive method which results from the combination of the three methods of gray scale drive above, a maximum integer number n, which satisfies a relation obtained by combining the modulated data signal and the number of division of the data electrode constituting single pixel as such that either the linear gray scale number per single pixel is not less than $[(m+1)^{n-1}+1]$ or the non-linear gray scale number per single pixel is not less than n+1, is preferably combined with the repetition times m of line addressing per single pixel in a single frame or single field, in such a manner that the transmittance per pixel be controlled to yield a ratio of $1:(m+1)^1:(m+1)^2:\ldots:(m+1)^{n-2}:(m+1)^{n-1}$. A further improved multi-gray-level display can thereby be obtained.

According to an embodiment of the present invention, there is provided a full color display by combining any of the drive methods above with a color filter or a color integration method.

More specifically, the R, G, and B color filters may be combined with the pixels of the passive-matrix addressed liquid crystal display driven by any of the aforementioned methods. Otherwise, the backlight corresponding to each of the colors, i.e., R, G, and B, may be switched at least once within a single frame or single field in combination with the passive-matrix addressed liquid crystal display device (not equipped with a color filter) driven by any of the aforementioned methods. The gray scale corresponding to each of the colors can be selected in this manner.

The present invention furthermore provides a liquid crystal device having a constitution as such that it may be driven by any of the aforementioned drive methods. A liquid crystal device may be constructed into a structure illustrated in, for example, FIG. 12, or FIG. 28 according to a conventional structure. However, the structure shown in FIG. 12 is preferred from the viewpoint of implementing a device exhibiting a starlight texture.

The liquid crystal device can be fabricated by following an ordinary process. For instance, the fabrication process comprises depositing a transparent ITO layer on a glass substrate by means of sputtering, and obliquely vacuum depositing SiO on the substrate after patterning the ITO layer by photolithography. After assembling a liquid crystal cell, a liquid crystal containing fine grains uniformly mixed therein is injected into the cell gap. A polyimide film subjected to rubbing treatment or an obliquely vapor deposited SiO film can be utilized as the liquid crystal alignment sheet.

In case a vapor deposited silicon oxide film is used as the alignment sheet, the vapor deposited film is preferably subjected to annealing after the deposition. This treatment is preferred from the viewpoint of obtaining a starlight texture for the liquid crystal by modifying the surface properties of the sheet.

Referring to FIG. 14, a detailed process for fabricating a liquid crystal device is described below.

Firstly, the process for fabricating a liquid crystal cell is described. The constitution of the cell illustrated in FIG. 14 corresponds to those shown in FIG. 12 and FIG. 28. Referring to FIG. 14, transparent electrodes 2*a* and 2*b* made from an ITO film having a resistivity of 100 Ω/z,900 are formed on transparent glass substrates 1*a* and 1*b*. Obliquely vapor deposited SiO films 3*a* and 3*b* are formed as i quid crystal alignment sheets on the transparent electrodes. The obliquely deposited SiO films are obtained by placing a substrate inside a vacuum deposition apparatus in such a manner that SiO vapor may be perpendicularly incident to the substrate when evaporated from the SiO vapor deposition source. The substrate is set as such that the normal thereof may make an angle of 85 degrees with respect to the vertical line. After vapor depositing SiO on the substrate at a temperature of 170° C., the substrate having thereon the vapor deposited SiO is stored in air at 300° C. for a duration of 1 hour. In addition to the obliquely vapor deposited SiO film, an organic film based on such as polyimide and Nylon can be used as the alignment film after subjecting it to rubbing treatment.

The two substrates each having thereon the alignment sheet thus fabricated are assembled to oppose each other, in such a manner that the surfaces having thereon the alignment sheet may face each other and that the directions of alignment treatment may be reversed with respect to each other. Glass beads 4 (for example, "Shinshi-kyu" having a diameter of from 0.8 to 3.0 μm; a product of Catalysts & Chemicals Industries Co., Ltd.) which provides the desired cell gap length are incorporated as spacers between the two substrates. The spacers are placed depending on the size of the transparent substrate. When substrates of smaller size are used, the spacers are dispersed into the sealing agent which is used for adhering the periphery of the substrates. In such a case, the spacers are dispersed into, for example, a ultraviolet (UV) curable adhesive 6, "Photorek" (a product of Sekisui Chemical Co., Ltd.), at a concentration of about 0.3% by weight, and the adhesive is applied to the periphery of the substrates to control the gap between the substrates. When substrates having a large area are used, the glass beads ("Shinshi-kyu") are scattered on the substrate at a density of 100 beads/mm$^2$ in average to set a gap between the substrates, and the periphery of the cell is sealed using the above sealing agent after reserving a hole through which the liquid crystal is filled into the cell.

A liquid crystal composition comprising fine grains is prepared thereafter. The liquid crystal composition can be prepared, for example, by adding 10 mg of carbon black, "Mogul" (a product of Chabot Inc.), into 1 g of a ferroelectric liquid crystal, "CS-1014" (a product of Chisso Corporation), and homogeneously dispersing the fine grains of carbon black in the liquid crystal composition by applying an ultrasonic homogenizer at an isotropic phase temperature of the liquid crystal. Other usable ferroelectric liquid crystals include the products of Chisso Corporation, Merck & Co., Inc., and BDH Co., Ltd. Also usable are other known ferroelectric liquid crystal compounds and liquid crystals comprising non-chiral liquid crystals. Thus, so long as it exhibits a chiral smectic phase in the temperature range of use, any composition can be used without particular limitations concerning the type of composition and the phase series.

The resulting liquid crystal composition is filled inside the cell thereafter. The composition comprising a ferroelectric liquid crystal 5 added therein fine grains (i.e., fine grains of carbon black) 10, or the ferroelectric liquid crystal composition, is filled inside the cell under reduced pressure at such a temperature in which the liquid crystal remains in its isotropic phase or in its chiral nematic phase and has fluidity. The resulting cell filled with the liquid crystal is gradually cooled, and sealed with an epoxy adhesive after removing the liquid crystal remaining on the glass substrate around the hole for filling the liquid crystal. The structure is completed into a ferroelectric liquid crystal device in this manner.

As mentioned in the foregoing, the present invention is characterized in that it employs a liquid crystal device comprising a pair of substrates with a liquid crystal incorporated therebetween, and that said liquid crystal comprises finely distributed domains differing in threshold voltage for use in switching said liquid crystal. Thus, in the resulting liquid crystal device, the transmittance within a single pixel changes relatively gradually because the transmittance of each of the fine domains (micro-domains) differing in threshold voltage ($V_{th}$) that are developed within a pixel changes differently with the change in intensity of the applied voltage. Accordingly, a single domain provided with a bistable liquid crystal molecule exhibits a memory function to realize a flicker-free still image. Furthermore, because a single pixel is formed from domains each having a size in the order of micrometers, an analog continuous gray scale display can be realized with high contrast.

Multiple gray-scale level display with further improved quality can be realized by applying, to the liquid crystal device above, and particularly to a liquid crystal display capable of passive-matrix addressed drive, any of the aforementioned drive methods, i.e., a method of modulating pulse voltage or pulse width or both, a method of dividing the pixel electrode, and a time integration method. A large-area liquid crystal device capable of full color video rate drive can also be realized at low cost. It should be noted that a gray scale display can be also be realized by simply combining the drive methods above without using a liquid crystal device which comprises micro-domains differing in threshold voltage.

BRIEF DESCRIPTION OF THE DRAWINGS

FIG. 11(A) shows a case which provides a gray scale display and FIG. 11(B) shows a case which provides a display having no gray scale;

DETAILED DESCRIPTION OF THE PREFERRED EMBODIMENTS

Figure 1A:
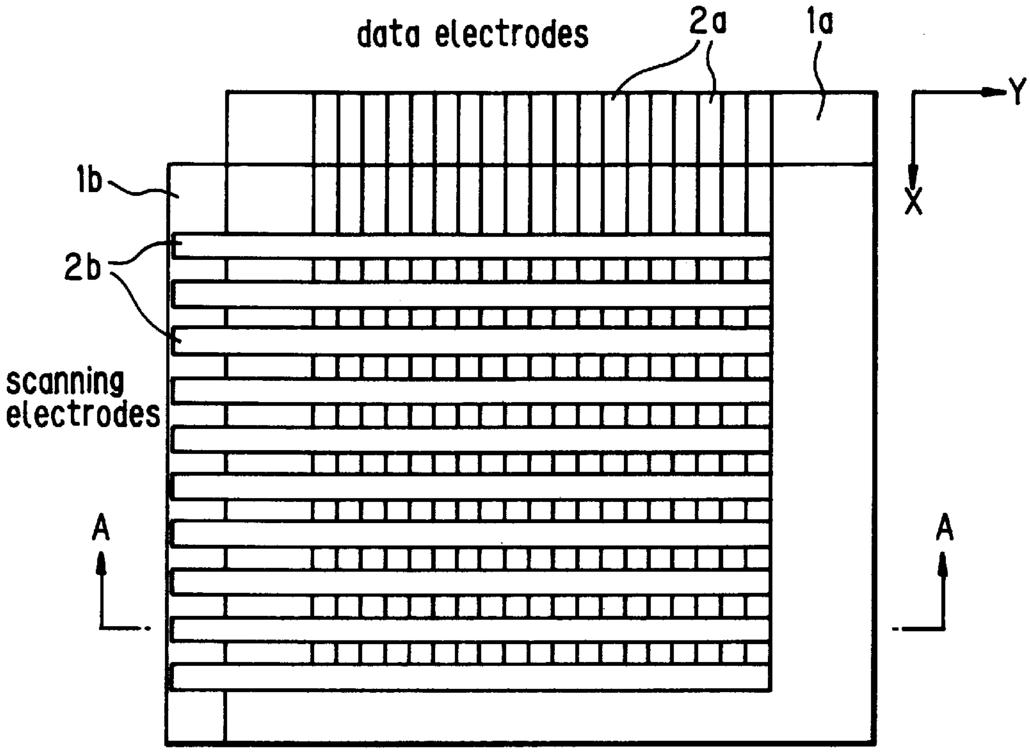
FIGS. 1(A) and 1(B) each show schematically drawn planar view and cross section view, respectively, of a liquid crystal device according to an embodiment of the present invention.

The present invention is described in further detail below referring to the preferred embodiments according to the present invention. It should be understood, however, that the present invention is not to be construed as being limited to the examples below.

EXAMPLE 1

A process for fabricating a direct X-Y matrix-addressed panel is described below.

Referring to FIG. 1, transparent electrodes 2*a* and 2*b* were formed on 0.7 mm thick transparent Corning 7059 glass substrates 1*a* and 1*b* by using an ITO having a resistivity of 100 Ω/□. The resulting transparent electrodes were subjected to etching to divide them into strips. Thus were formed data electrodes 2*a* and scanning electrodes 2*b*.

Obliquely vapor deposited SiO films 3*a* and 3*b* were formed on the resulting structure to provide liquid crystal alignment sheets. The obliquely deposited SiO films were obtained by placing a substrate inside a vacuum deposition apparatus in such a manner that SiO vapor may be perpendicularly incident to the substrate when evaporated from the SiO vapor deposition source. The substrate was set as such that the normal thereof may make an angle of 85 degrees with respect to the vertical line. After vapor depositing SiO on the substrate at a temperature of 170° C., the substrate having thereon the vapor deposited SiO was stored in air at 300° C. for a duration of 1 hour.

The two substrates each having thereon the alignment sheet thus fabricated were assembled to oppose each other, in such a manner that the surfaces having thereon the alignment sheet might face each other and that the directions of alignment treatment might be reversed with respect to each other. Furthermore, the arrays of data electrodes and scanning electrodes were disposed as such that they might cross making a right angle with each other. Glass beads 4 ("Shinshi-kyu", having a diameter of from 0.8 to 3.0 μm; a product of Catalysts & Chemicals Industries Co., Ltd.) which provides the desired cell gap length were incorporated as spacers between the two substrates. Although the two substrates each having thereon the alignment sheet herein were assembled to oppose each other in such a manner that the directions of alignment treatment might be reversed with respect to each other, they might be otherwise arranged in such a manner that the directions of alignment be in parallel with each other.

In case substrates of smaller size were used, the spacers were dispersed into the sealing agent which was used for adhering the periphery of the substrates. In such a case, the spacers were dispersed into a UV curable adhesive 6, "Photorek" (a product of Sekisui Chemical Co., Ltd.), at a concentration of about 0.3% by weight, and the adhesive was applied to the periphery of the substrates to control the gap between the substrates. In case substrates having a large area were used, the glass beads ("Shinshi-kyu") were scattered on the substrate at a density of 100 beads/mm$^2$ in average to set a gap between the substrates, and the periphery of the cell was sealed using the above sealing agent after reserving a hole through which the liquid crystal is to be filled into the cell.

A liquid crystal composition comprising fine grains was prepared thereafter. The liquid crystal composition was prepared, for instance, by adding 10 mg of carbon black, "Mogul" (a product of Chabot Inc.), into 1 g of a ferroelectric liquid crystal, "CS-1014" (a product of Chisso Corporation), and homogeneously dispersing the fine grains of carbon black in the liquid crystal composition by applying an ultrasonic homogenizer at an isotropic phase temperature of the liquid crystal. Otherwise, the ferroelectric liquid crystal was used alone without adding therein any fine grains. The quantity of carbon black to be added can be varied as desired.

The resulting liquid crystal composition was filled inside the cell thereafter. The composition comprising a ferroelectric liquid crystal added therein fine grains (i.e., fine grains of carbon black), or the ferroelectric liquid crystal composition alone, was filled inside the cell under reduced pressure at such a temperature in which the liquid crystal maintained its isotropic phase or its chiral nematic phase and fluidity. The resulting cell filled with the liquid crystal was gradually cooled thereafter, and was sealed with an epoxy adhesive after removing the liquid crystal remaining on the glass substrate around the hole provided for filling the liquid crystal. The structure was thus completed into a liquid crystal device.

Figure 2:
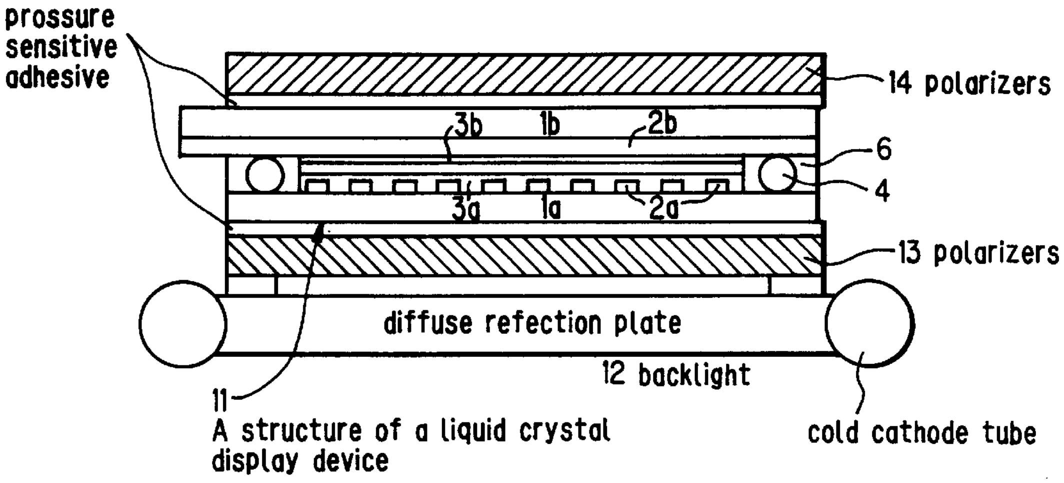
FIG. 2 shows a schematically drawn cross section view of a liquid crystal device according to an embodiment of the present invention under operation.

The panel 11 thus fabricated can be used as a display device as shown in FIG. 2, by laminating, in this order, a backlight 12, a polarizer 13, the liquid crystal panel, and a polarizer 14. The key in fabricating a display device above is the alignment of the direction of the light polarized by the polarizers and the optical axis of the liquid crystal. Preferably, they are arranged in such a manner that the light from the backlight may be switched by the switching action of the liquid crystal to achieve a highest contrast.

Figure 3:
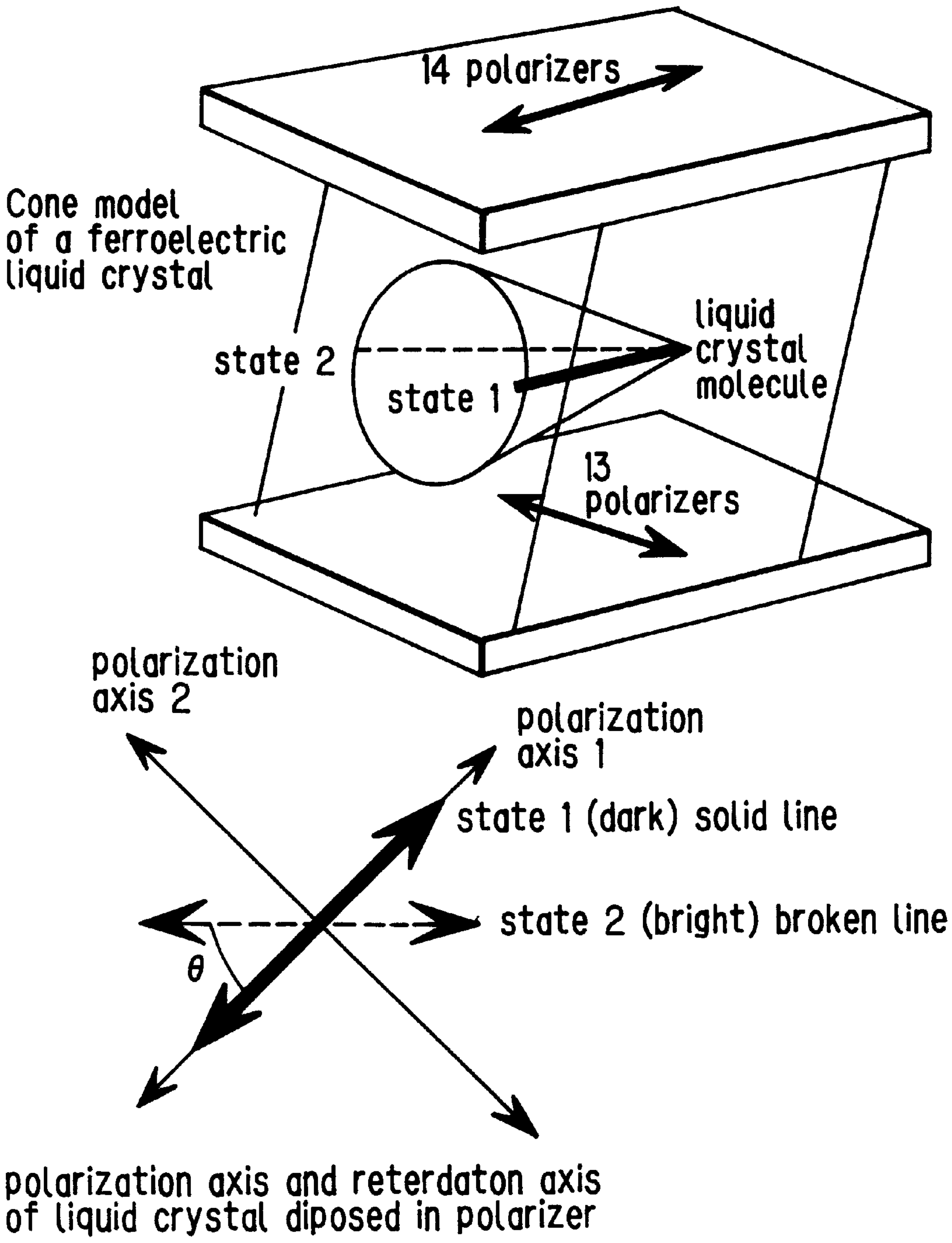
FIG. 3 shows schematically the disposition of a liquid crystal molecule on a polarizer for a liquid crystal device according to an embodiment of the present invention.

The preferred arrangement can be realized in the following manner. A case using a ferroelectric liquid crystal is described. Referring to FIG. 3, the direction of the light polarized by the polarizer 13 is set in parallel with the axis of retardation of one of the bistable states while setting the direction of the light polarized by the polarizer 14 at a direction making right angle with respect to that of the axis of retardation. Because the light polarized by the polarizer 13 is parallel to the axis of retardation, it can be seen that the light linearly polarized by the polarizer 13 is transmitted through the liquid crystal panel without being influenced by the birefringence, and that it provides a light incident to the polarizer 14. Since the polarizers 13 and 14 cross each other, the optical component transmitted by the polarizer 13 is completely cut by the polarizer 14. This state corresponds to the black level.

When the liquid crystal molecules of a CS-1014 based liquid crystal switch into the other bistable state, the axis of retardation rotates for about 45 degrees. Because the direction of polarization of the light transmitted through the polarizer 13 does not coincide with that of the retardation axis of the liquid crystal, the light incident to the liquid crystal panel is influenced by the birefringence to rotate its polarization plane for an angle of 90 degrees according to the following equation:

$$I = I_0 \cdot \sin^2(2\theta) \cdot \sin^2(\pi \cdot \Delta n \cdot d / \lambda)$$

$$\Delta n = n_e - n_o$$

where, $I_0$ represents the intensity of light passed through the polarizer 13; I represents the intensity of light passed through the polarizer 14; θ represents the cone angle (the angle between retardation axes of the state 1 and the state 2); $n_e$ represents the index of refraction of the extraordinary light; $n_o$ represents the index of refraction of the ordinary light; Δn represents the birefringence at wavelength λ; and d represents the gap length of the cell (the thickness of the liquid crystal layer).

Thus, the polarization plane is rotated to change sequentially from a linearly polarized light to an elliptically polarized light, then to a circularly polarized light, and to a linearly polarized light again via an elliptically polarized light. The light finally passes through the polarizer 14 and the liquid crystal cell turns into a white state, because the direction of the polarized light finally matches with the axis of transmitting the polarized light in the polarizer 14.

Referring to the equation above, the intensity I of the light transmitted through the polarizer 14 can be varied continuously by continuously controlling the cone angle θ. In other words, a gray scale display can be realized. This method is already known for a monostable ferroelectric crystal. In the surface stabilized bistable ferroelectric liquid crystal device (SSBFLC device) proposed by Clark et al. in U.S. Pat. No. 4,367,924, however, the angle θ can take only two values due to the bistability of the SSBFLC. Thus, the device results in a two gray-scale level display in which either a black state or a white state is exhibited, and it hence fails to achieve a multiple gray-scale level display.

The method of providing gray scale within a single pixel (i.e., the pulse voltage modulation method) is described below.

Figure 1B:
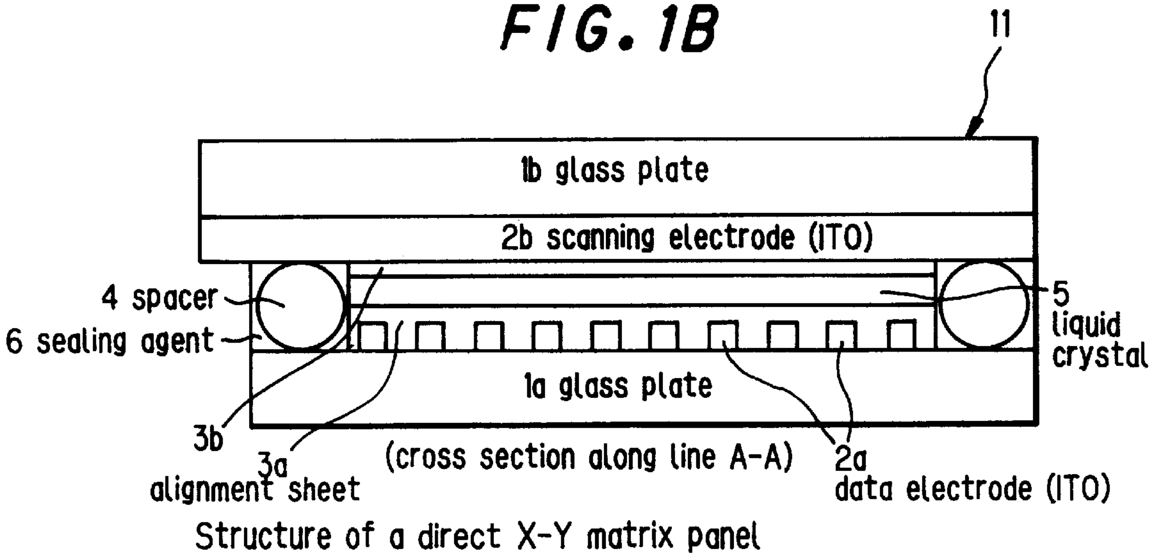

According to the present example, a panel filled with a ferroelectric liquid crystal composition comprising the aforementioned fine-grains (carbon black) in the same constitution as shown in FIGS. 1(A) and 1(B) or in FIG. 2 was fabricated. The liquid crystal panel thus fabricated was driven in the following manner.

Figure 4:
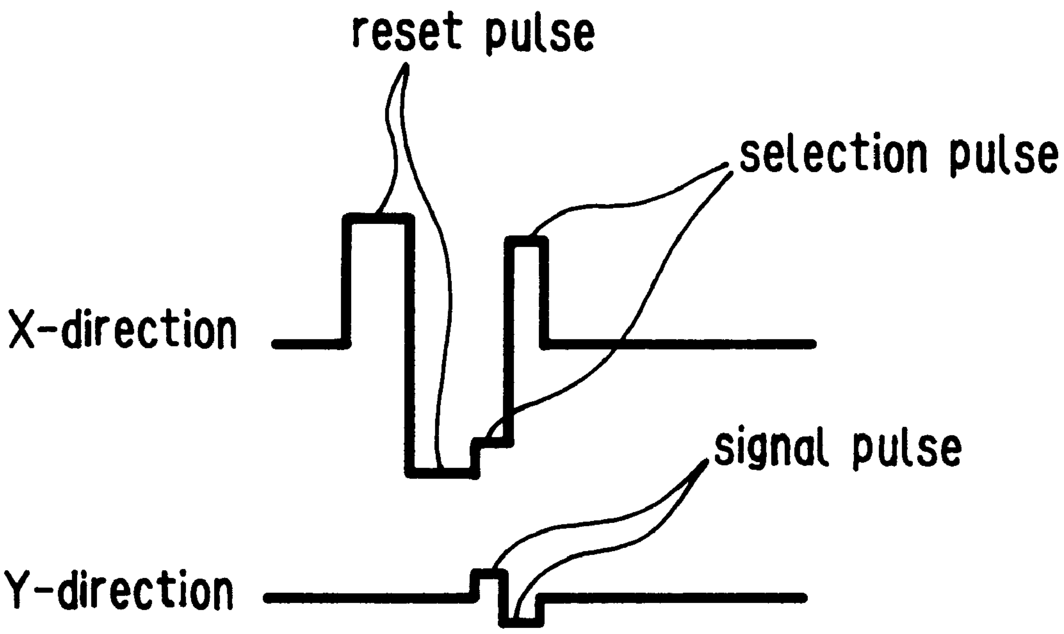
FIG. 4 shows the scanning waveform and the signal waveform for a liquid crystal device according to an embodiment of the present invention.

Referring to FIG. 4, electric signals for selecting the pixel display were applied to the transparent electrodes 2*b* arranged along the Y-direction, and electric signals corresponding to the information to be displayed, white or black, or an intermediate level gray scale, were applied to the transparent electrodes 2*a* arranged along the X-direction.

Figure 10:
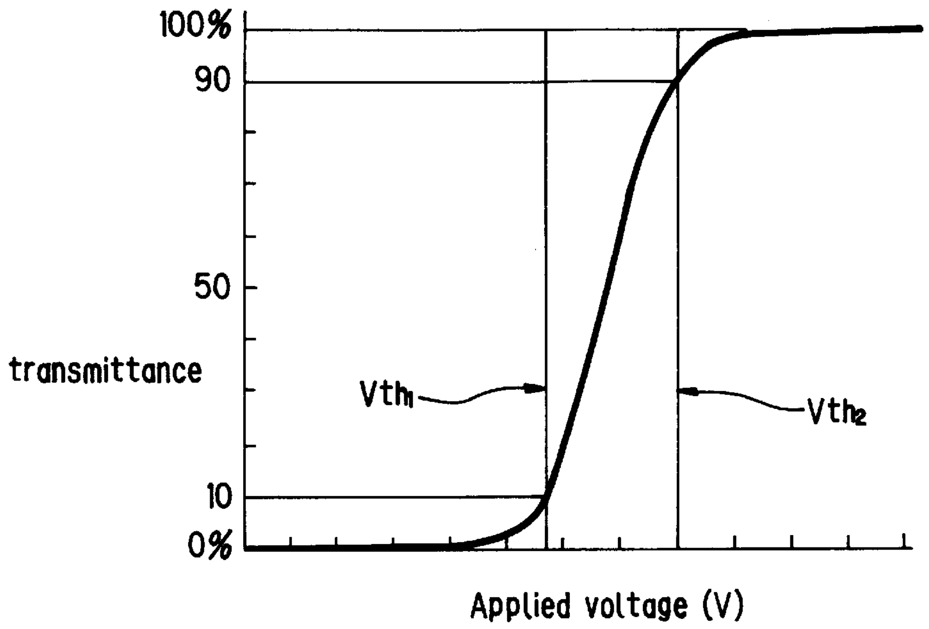
FIG. 10 is a graph in which a transmittance vs. applied voltage curve is given, showing the threshold voltage characteristics of a liquid crystal device according to an embodiment of the present invention.
Figure 11A:
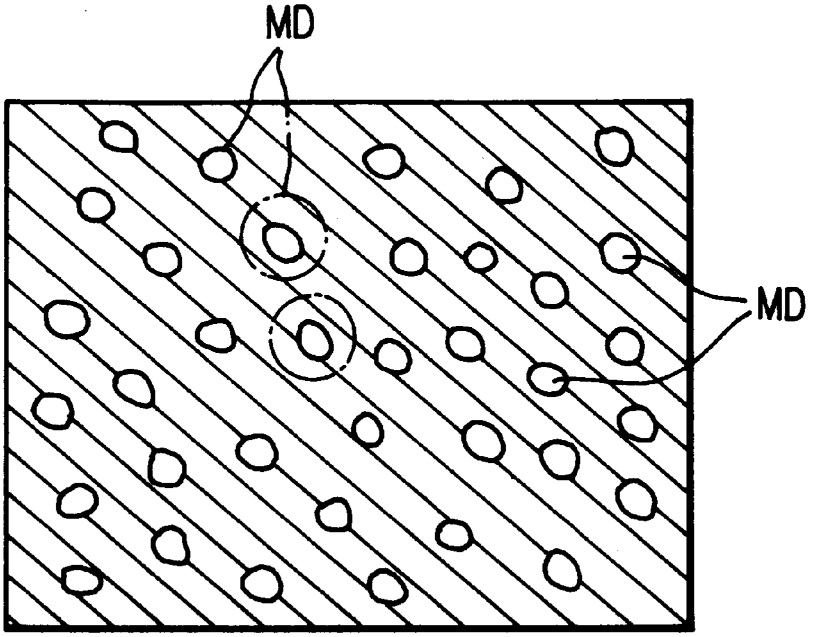
FIGS. 11(A) and 11(B) are each schematically drawn textures observed on a liquid crystal device, provided as a means to explain the change in transmittance with switching; where.
Figure 11B:
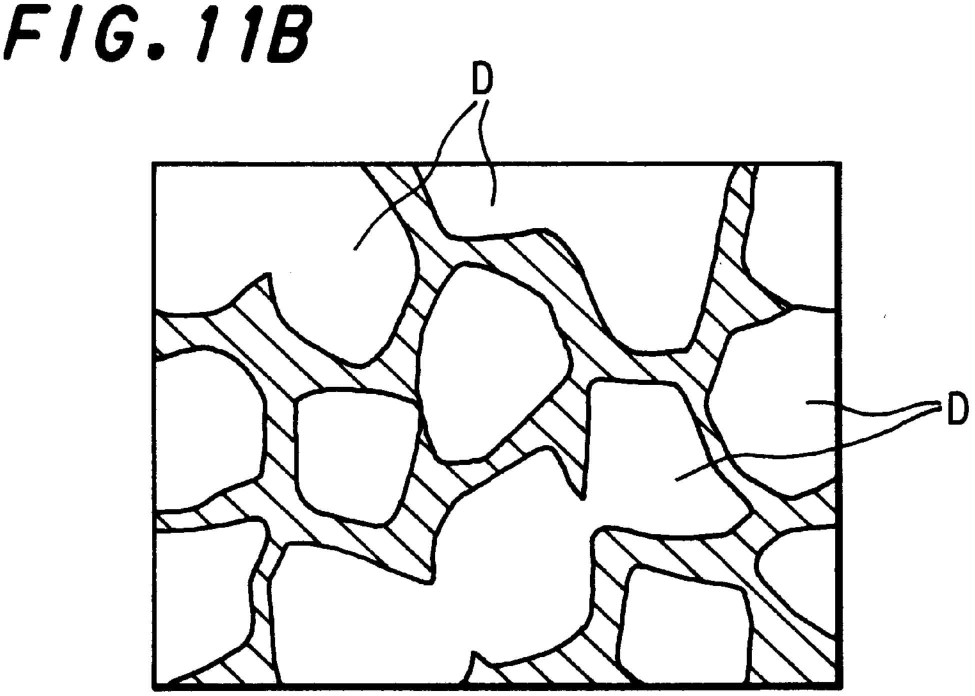
Figure 12:
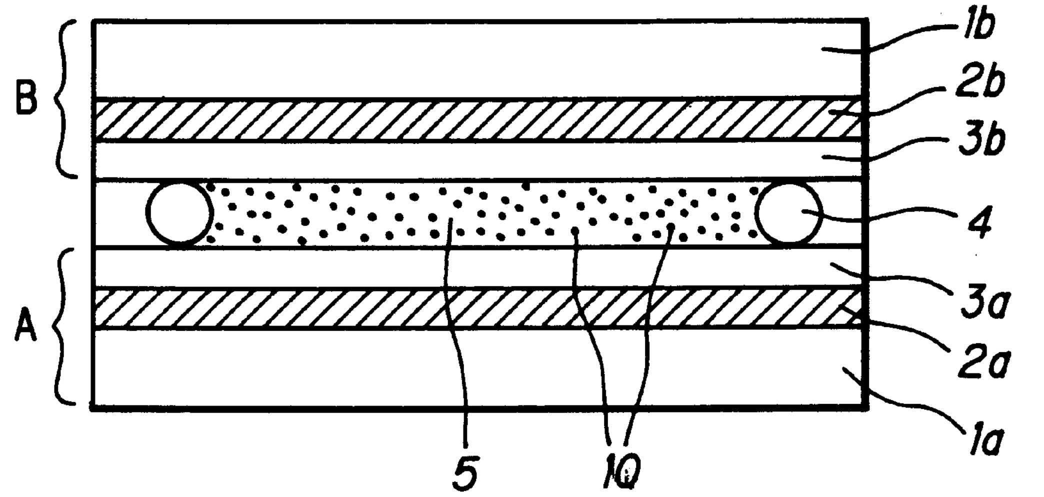
FIG. 12 is a schematically drawn cross section view of a liquid crystal device having a basic structure according to the present invention.
Figure 13:
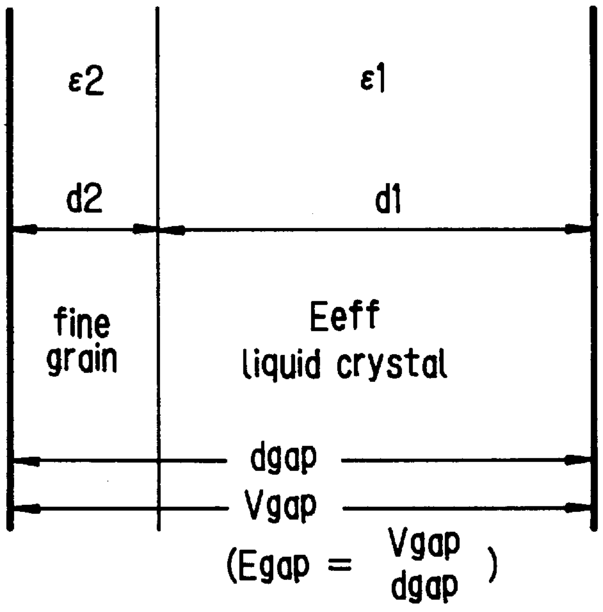
FIG. 13 is a schematic diagram provided as a means to explain the effective electric field in the liquid crystal of a liquid crystal device according to an embodiment of the present invention.
Figure 14:
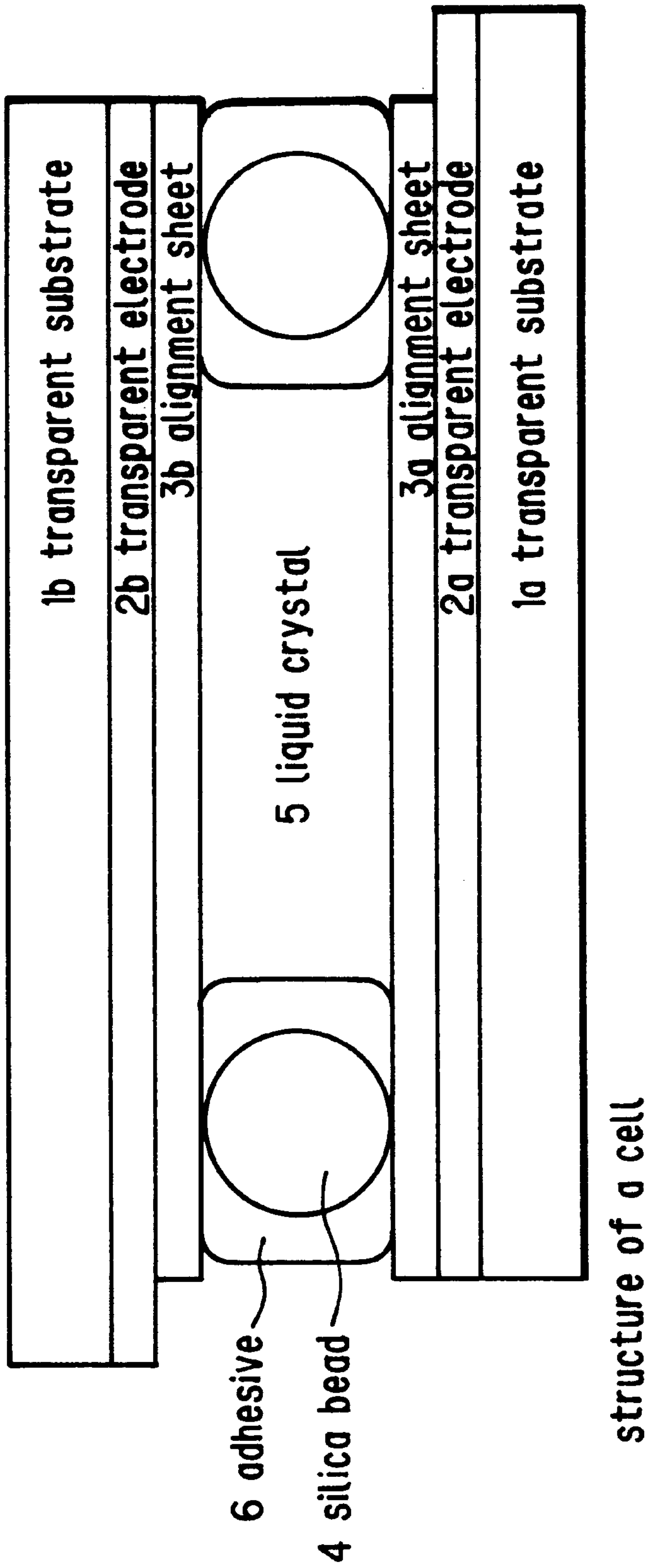
FIG. 14 is a schematically drawn cross section view of a liquid crystal device according to an embodiment of the present invention, provided as a means to explain the basic structure.

The waveform of the selection electric signal applied along the Y-direction is characterized as follows:

(1) The selection pulse is composed of two pulses which are symmetrical negative and positive pulses. The pulse voltage intensity and the height are determined by the threshold value of the liquid crystal device shown in FIG. 10. The pulse width depends on the response speed of the liquid crystal. The height of the pulse corresponds to the voltage at which the starlight texture is developed in the normally black monodomain. This voltage also corresponds to the threshold voltage $V_{thlow}$ obtained from the characteristic $T_r$-V curve, where, $T_1$ represents the change in transmittance of the liquid crystal cell between the crossed polarizers, and V represents the applied voltage.

(2) A symmetrical reset pulse is set before the selection pulse. The width of the reset pulse is twice that of the selection pulse, and the height of the reset pulse is set at a voltage capable of completely switching the liquid crystal. This voltage also corresponds to the total obtained by adding AV to the threshold voltage $Y_{thhigh}$ obtained from the characteristic $T_r$-V curve, where, ΔV represents the maximum signal voltage applied to the electrodes in the X-direction of the substrate 1*b* which is described hereinafter.

The waveform of the electric signal applied along the Y-direction for the data is characterized as follows:

(1) The signal electric pulse is composed of two pulses which are symmetrical negative and positive pulses. The pulse width is set at the same as that of the selection signal. The height $V_s$ of the signal voltage changes within a range of from 0 to $V_{thhigh}-V_{thlow}$ depending on the gray level of the liquid crystal to be displayed.

(2) The polarity of the signal voltage pulse is set opposite to that of the selection pulse. Thus, the total voltage $V_s+V_{thlow}$ is applied to a pixel at point (n,m) in the display, and it changes in a range of $V_{thhigh}-V_{thlow}$.

Figure 5:
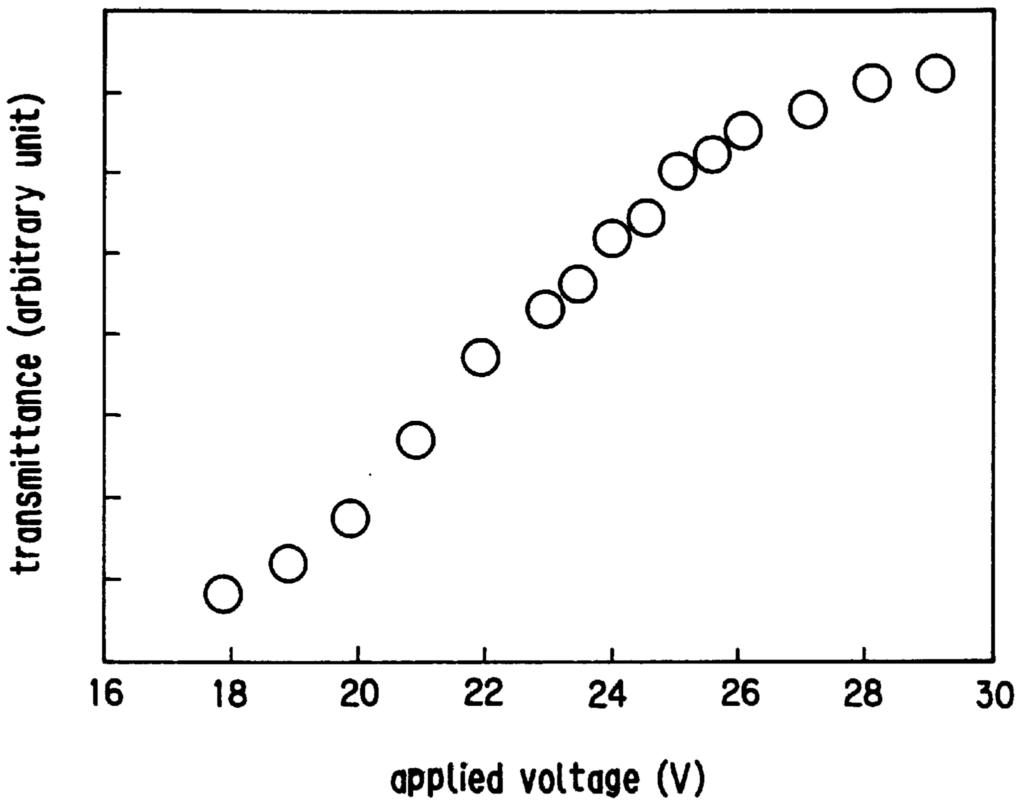
FIG. 5 is a graph in which transmittance vs. applied voltage values are plotted to yield the characteristic curve of a liquid crystal device according to an embodiment of the present invention.

FIG. 5 shows the change of transmittance when the voltage described above is applied to a liquid crystal cell. The liquid crystal cell used herein has a cell gap of 1.6 μm and comprises alignment sheets obtained by obliquely vapor depositing SiO in such a manner that the direction of deposition of the two sheets each deposited on the opposed substrates be in parallel with each other. The cell gap was measured using MS-2000 type film thickness measurement apparatus manufactured by Otsuka Denshi Co., Ltd. A liquid crystal composition comprising 1.3% by weight of fine-grained carbon "Mogul L" (a product of Chabot Inc.) was injected into the cell. The resulting liquid crystal cell was incorporated between crossed polarizers, and the direction of the cell was set as such that a minimum transmittance may be obtained for the liquid crystal cell at a memory state free of applied voltage.

The signal pulses were applied at a width of 350 μs, and the reset pulse was set at a width of 700 μs, i.e., a width twice that of the signal pulse. The reset voltage was set at 35 V because the threshold voltage of the cell was 34 V. The signal voltage was varied from 18 V to 30 V to observe the change in cell transmittance. FIG. 5 clearly reads that the transmittance of the cell changes continuously with the change in applied voltage from 18 V to 28 V. It can be seen therefrom that the transmittance of the liquid crystal cell is controllable in this range by controlling the intensity of the applied voltage.

Figure 6:
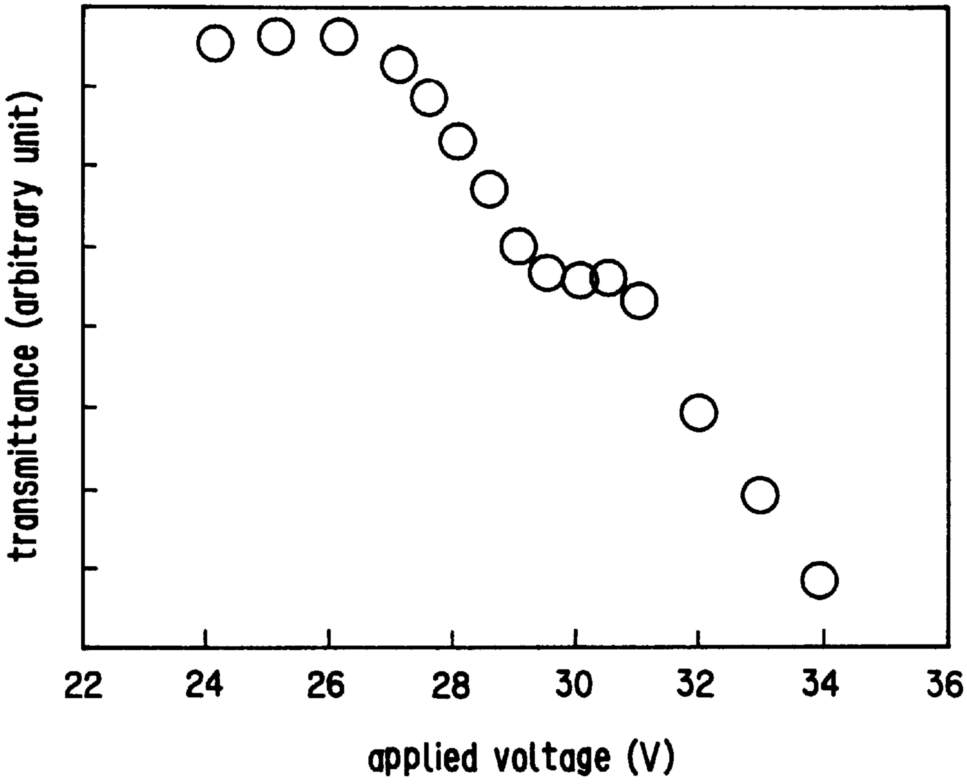
FIG. 6 is a graph in which transmittance vs. applied voltage values are plotted to yield the characteristic curve of a liquid crystal device according to another embodiment of the present invention.

FIG. 6 shows the change in transmittance with increasing applied voltage for a cell having a gap of 1.8 μm and which was fabricated in the same manner as above, except that the alignment sheets were vapor deposited in such a manner that the direction of deposition thereof might be reversed with respect to each other. The cell was set between the crossed polarizers in such a manner that a maximum transmittance might be obtained on the cell at the state when no electric field was applied to the cell.

The signal pulses were applied at a width of 350 μs, and the reset pulse was set at a width of 700 μs, i.e., a width twice that of the signal pulse. The reset voltage was set at 35 V. The signal voltage was varied from 25 V to 30 V to observe the change in cell transmittance. Similar to the case above, it was found that the transmittance of the liquid crystal cell is controllable in this range by controlling the intensity of the applied voltage.

Based on the observed results above, the cell comprising ferroelectric liquid crystal containing fine-grained carbon was subjected to matrix-addressed drive to obtain a gray scale display.

The process for fabricating the cell is described below. ITO electrodes were deposited by sputtering on 52×52×0.7 $mm^3$ Corning 7059 glass substrates in a shape as illustrated in FIG. 1. The resistance of the ITO electrode was found to be 100 $\Omega/cm^2$. Thus, a cell having a gap of 1.5 μm was obtained by placing the two glass substrates in such a manner that the electrodes disposed on each of the substrates may cross each other making right angle. Obliquely vapor deposited SiO films were provided as the liquid crystal alignment sheets on each of the two substrates. The direction of the vapor deposition were reversed with respect to each other. The cell was filled with a liquid crystal composition comprising a ferroelectric liquid crystal "CS-1014" (a product of Chisso Corporation) containing 2% by weight of fine-grained carbon "Mogul L" (a product of Chabot Inc.).

Figure 7:
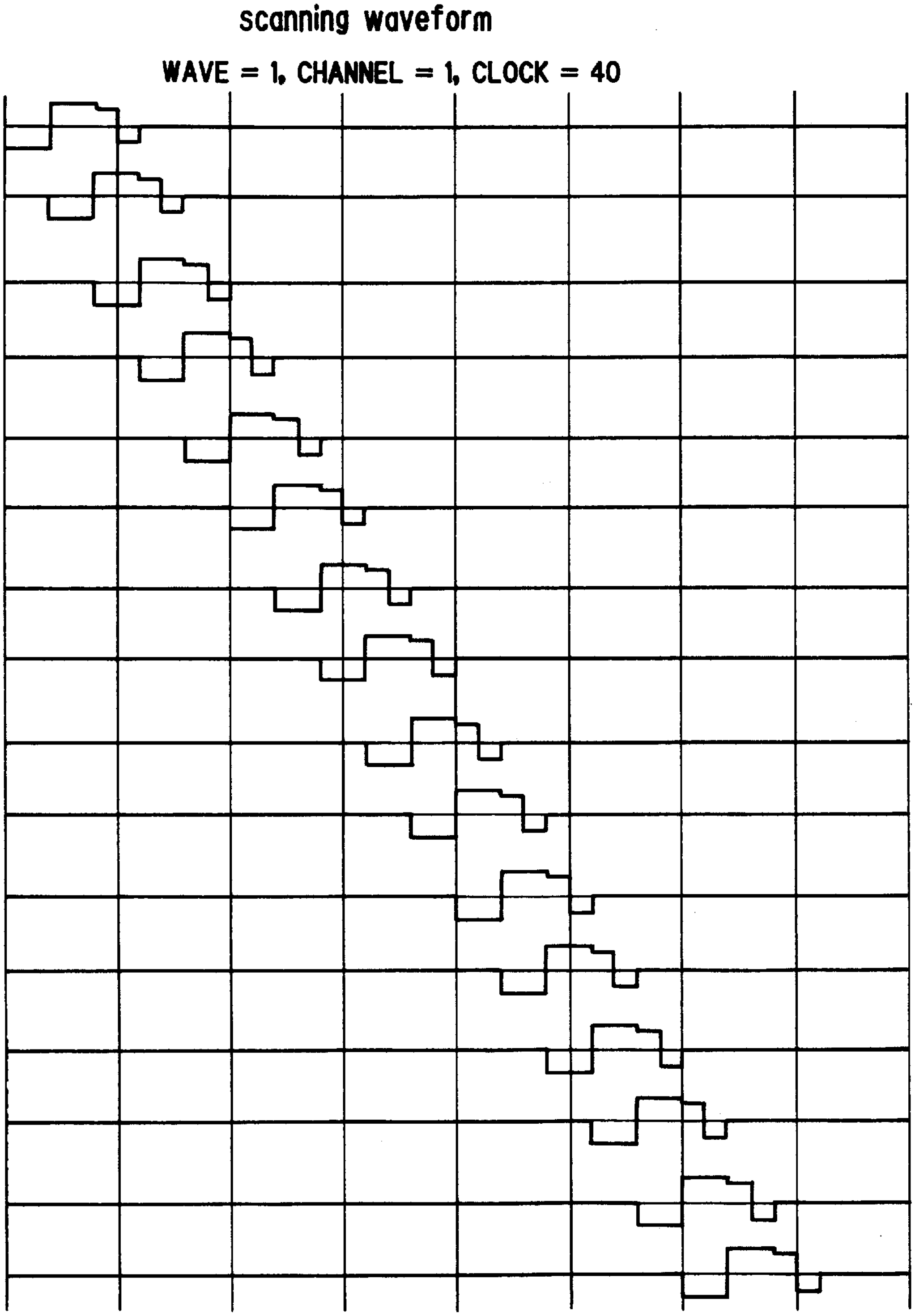
FIG. 7 shows a specific scanning waveform.
Figure 8:
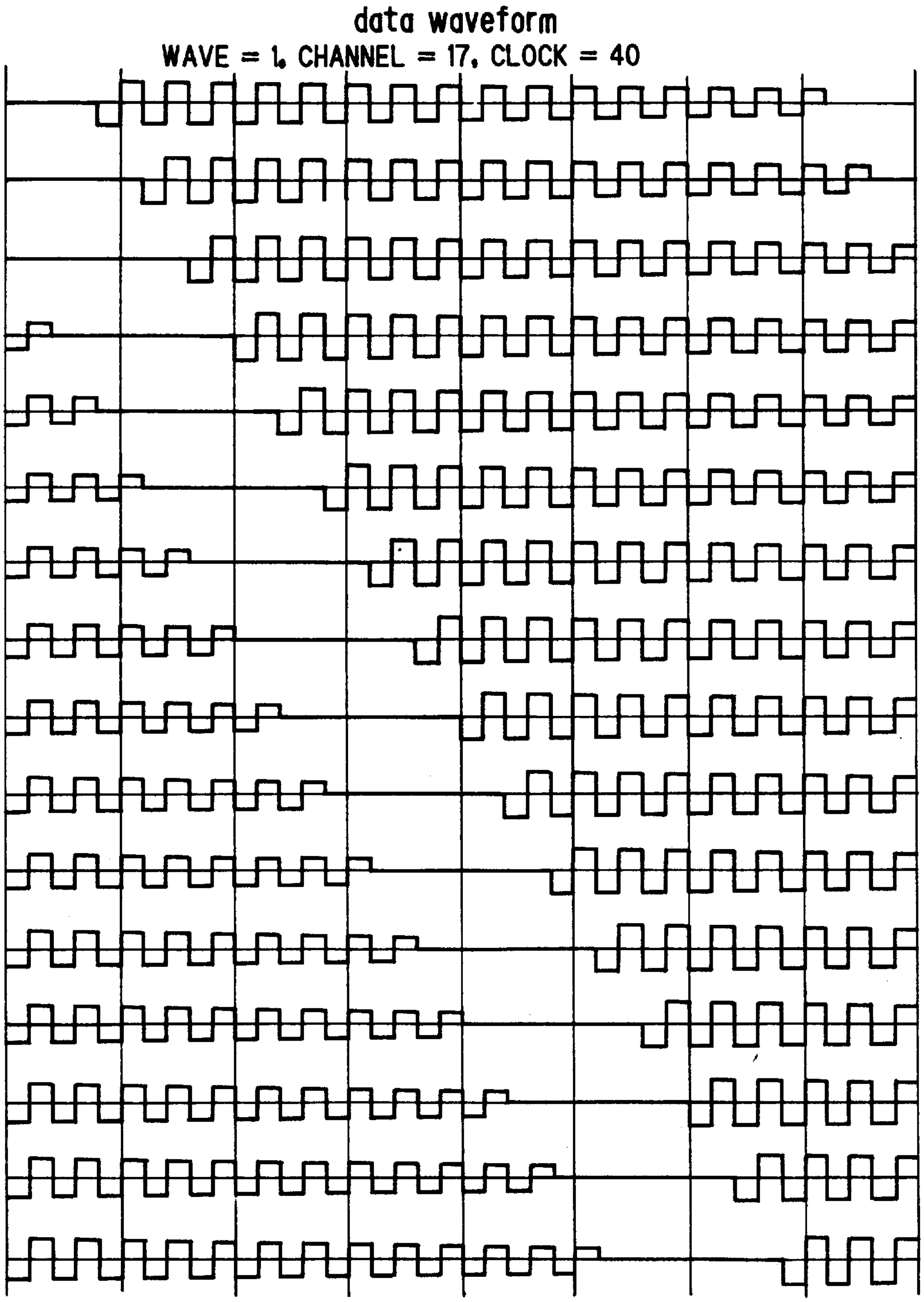
FIG. 8 shows a specific signal waveform.

FIGS. 7 and 8 show each the waveform of the voltage applied to the electrodes along the X-direction of substrate 1*b* and that applied to the electrodes along the Y-direction of substrate 1*a*, respectively. The signal applied to the electrodes along the Y-direction was furnished with a reset voltage of 24 V and a selection voltage of 20 V. The signal pulses were applied at a width of 400 μs, and the reset pulse was set at a width of 800 μs, i.e., a width twice that of the signal pulse. The voltage was applied to the electrodes in the X-direction at a pulse width of 300 μs, and the intensity of the voltage was varied in a range of from 2.5 V to 10 V to observe the change in cell transmittance.

Figure 9:
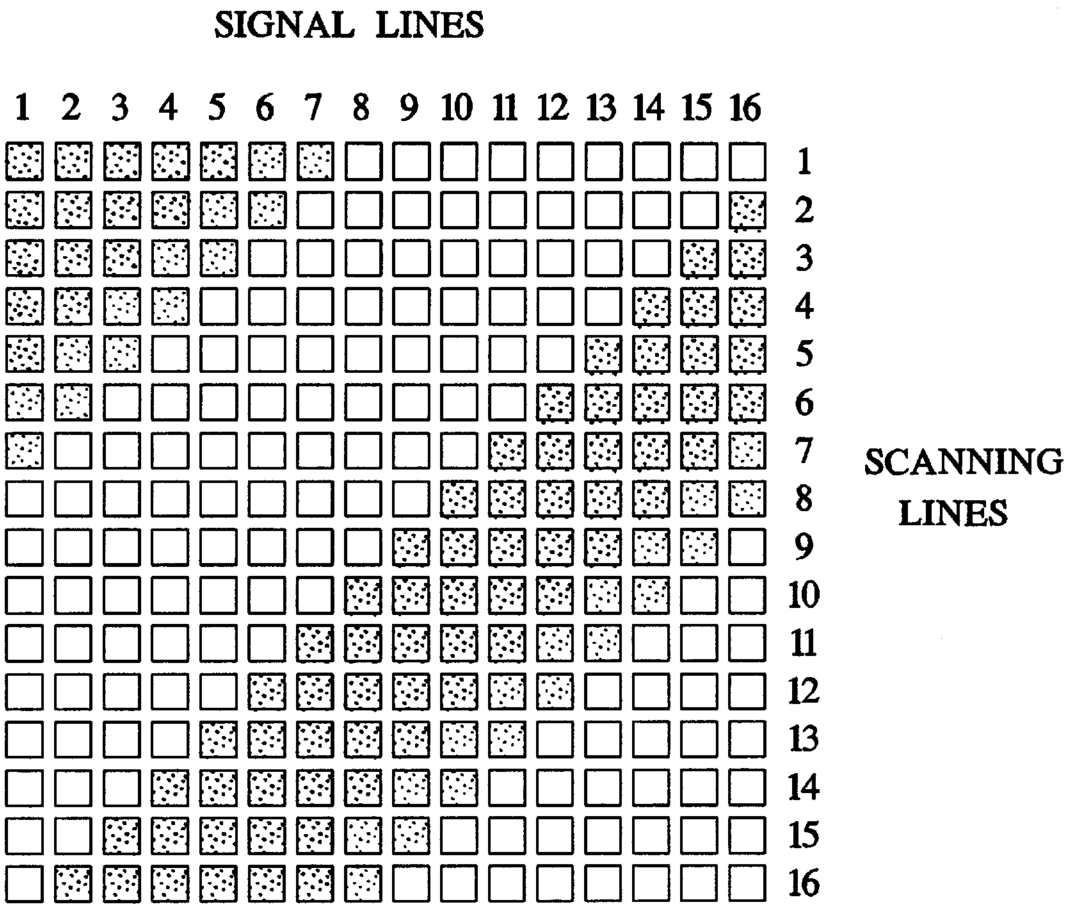
FIG. 9 shows a signal pattern obtained by applying the scanning waveform and the signal waveform illustrated in FIGS. 7 and 8, respectively.

FIG. 9 shows the display pattern obtained by applying the waveform above. It can be seen that a favorable gray scale display is obtained.

EXAMPLE 2

A process for driving a liquid crystal device by a method comprising dividing a pixel electrode into smaller portions (pixel electrode division method or area multi-gray-level method) is described below.

Figure 15:
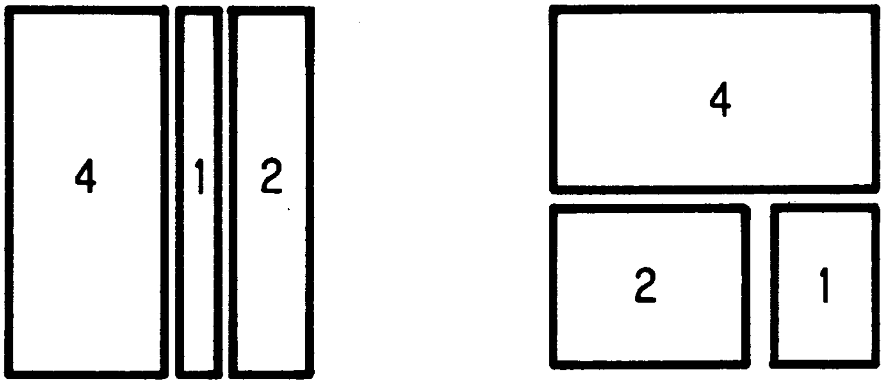
FIG. 15 is a schematically drawn enlarged planar view showing a pixel electrode divided into portions.
Figure 16:
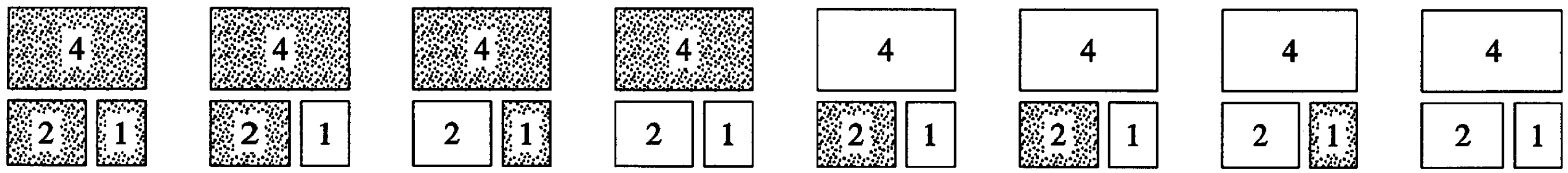
FIG. 16 is a schematically drawn planar view showing a gray scale which is obtained as a result of dividing a pixel electrode into portions according to a method specified in an embodiment of the present invention.

Referring to FIG. 15, a case of dividing a single pixel into three portions is described below. Thus, a pixel was divided into three portions at an area ratio of 1:2:4, and three types of pixel electrodes constituted a single pixel. The same bistable ferroelectric liquid crystal as that described above was used. Referring to FIG. 16, the following eight gray scale levels are obtained:

'000': 0, '001': 1, '010': 2, '011': 3,

'100': 4, '101': 5, '110': 6, '111': 7, where, 1 represents "bright", and 0 represent "dark".

The pixel electrode can be divided according to, for example, JP-A-229430, in which specific methods of division are disclosed. In case of driving a pixel defined by a perpendicular scanning electrode and a transverse scanning electrode, for instance, a the transverse scanning electrode may be divided into smaller electrodes having an area of $1/2$, $1/4$, . . . , $1/2^n$, with respect to the initial pixel, where n represents an integer.

In the pixel electrode division method above, signal lines, though not shown in the figure, are connected to each of the divided portions of the pixel electrodes above to apply data signals corresponding to the gray scale of the pixel. Thus, predetermined gray signals are applied to each of the divided portions of the pixel electrode. The electrode portions to which the data signals are applied yield transmittance (attributed to the starlight texture) according to the applied voltage.

A multiple gray scale level display can be thus realized by combining the area multi-gray-level method with a liquid crystal which exhibits a starlight texture, because a gray scale display can be obtained in each of the divided pixels depending on the intensity of the writing voltage applied to each of the divided portions of the pixel electrode.

Figure 17:
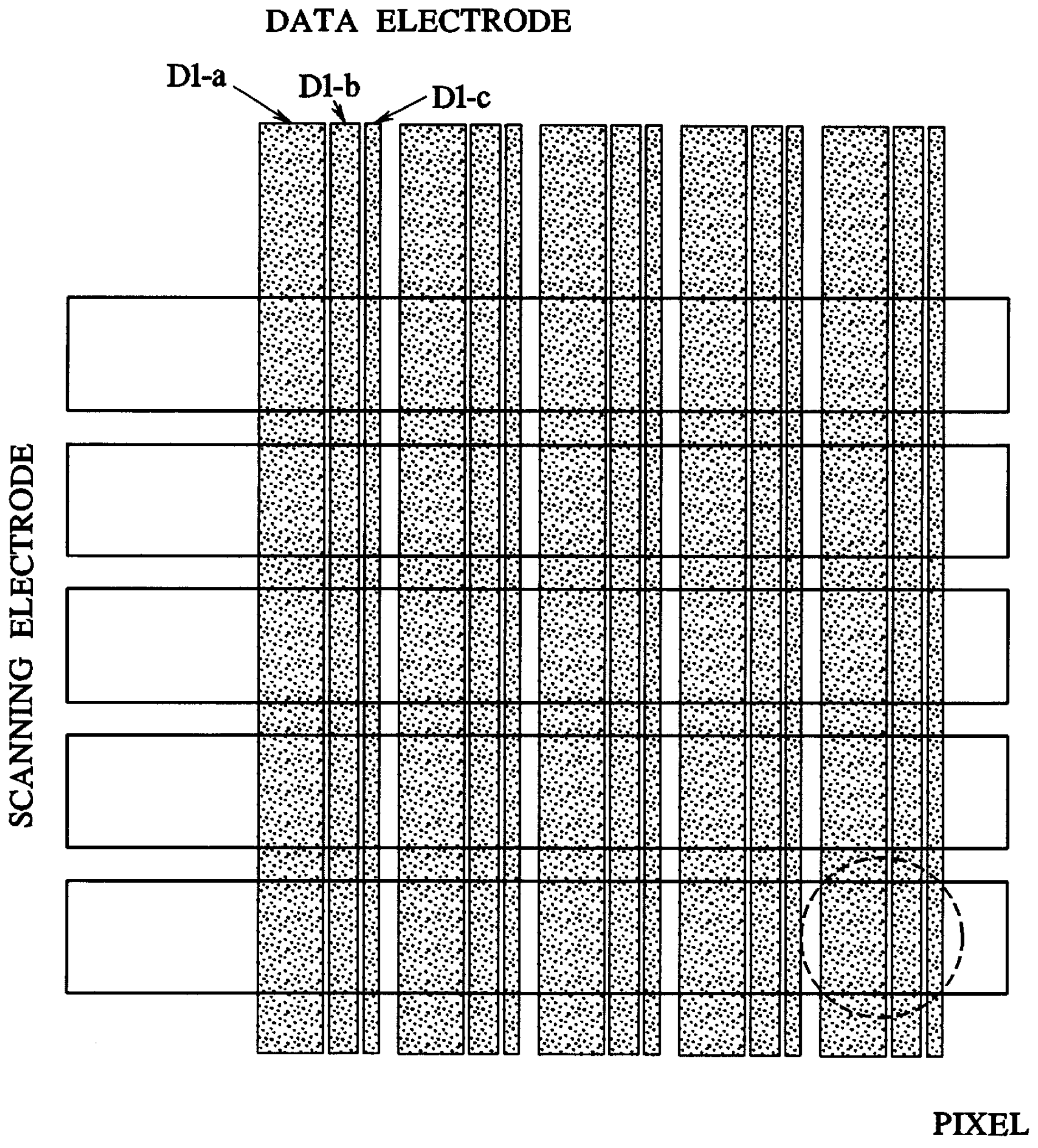
FIG. 17 is a schematically drawn planar view showing a pixel electrode divided into portions.

A specific example using an electrode structure as shown in the left-hand side of FIG. 15 is described below. Referring to FIG. 17, electrodes $D_{1-a}$, $D_{1-b}$, and $D_{1-c}$ obtained by dividing each of the ITO transparent data electrodes at an area ratio of 4:2:1 are used as the data electrodes. A cell was thus fabricated in the same manner as in Example 1. The cell was filled with a liquid crystal containing 2% by weight of fine-grained carbon "Mogul L" (a product of Chabot Inc.). A scanning voltage having a waveform shown in FIG. 7 and a data voltage having basically the waveform shown in FIG. 8 were applied.

In case a voltage having the waveform of FIG. 8 is applied to the thus divided data electrodes, 16 gray scale levels were obtained as shown in FIG. 9, because each of the divided electrodes a, b, and c cannot be distinguished from each other. The data signals can be applied selectively to the divided electrodes depending on the gray scale, for example, the divided electrode c alone can be selected. Since an 8-level gray scale is applied to each of the gray scales obtained for the case without pixel division, the gray scale of the minimum pixel area gives the minimum resolution in such a case.

More specifically, a resolution of $(1/7)\times(1/15)$ $1/105$ is obtained in the specific case above. It can be seen that a 106-level gray scale is realized within a pixel. It is also possible to apply a voltage to each of the divided electrodes a, b, and c independent to each other, however, it can be readily understood that the maximum gray level results in 106 because the resolution is the same for the divided electrodes. A display with further increased gray scale levels is described hereinafter in Example 6.

EXAMPLE 3

A process for driving a liquid crystal device by the time integration method is described below. The time integration method comprises repeating line addressing for a plurality of times per one pixel in a single frame or field. A gray scale display can be thus obtained in a time-averaged manner depending on the frequency of flickering within a single frame or field. The gray scale level, (m+1), is therefore determined by the ratio of bright and dark states while repeating line addressing for m times.

Figure 18:
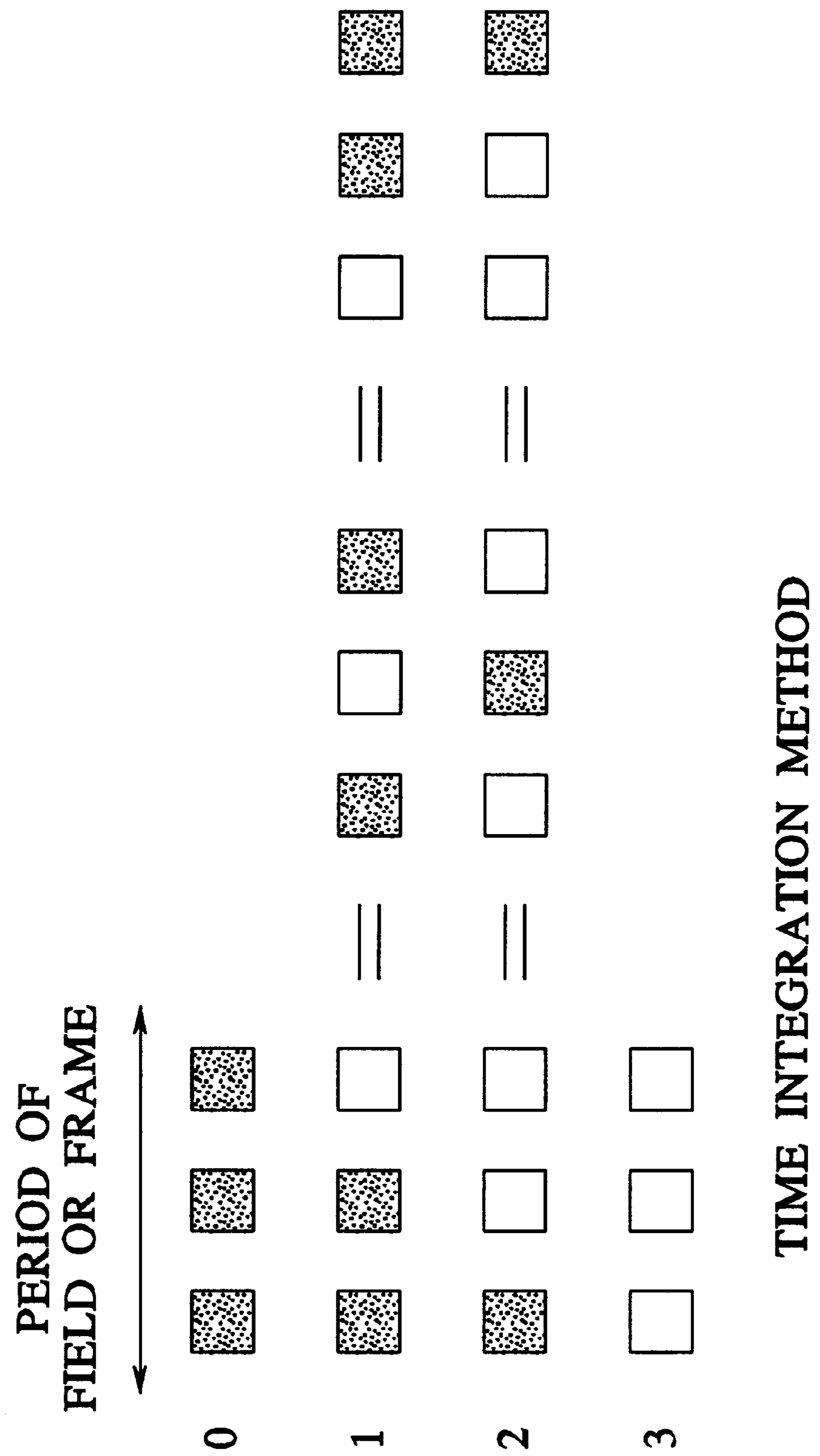
FIG. 18 is a schematically drawn planar view showing a gray scale which is obtained as a result of applying a time integration method according to another embodiment of the present invention.

Considering a switching of a liquid crystal in a single pixel sandwiched between the scanning electrodes and the data electrodes at the crossing point thereof, four gray scale levels as illustrated in FIG. 18 can be obtained by repeating three times of line addressing. The gray scale level can be further controlled by using a liquid crystal exhibiting a starlight texture in accordance with the applied pulse voltage.

Figure 19:
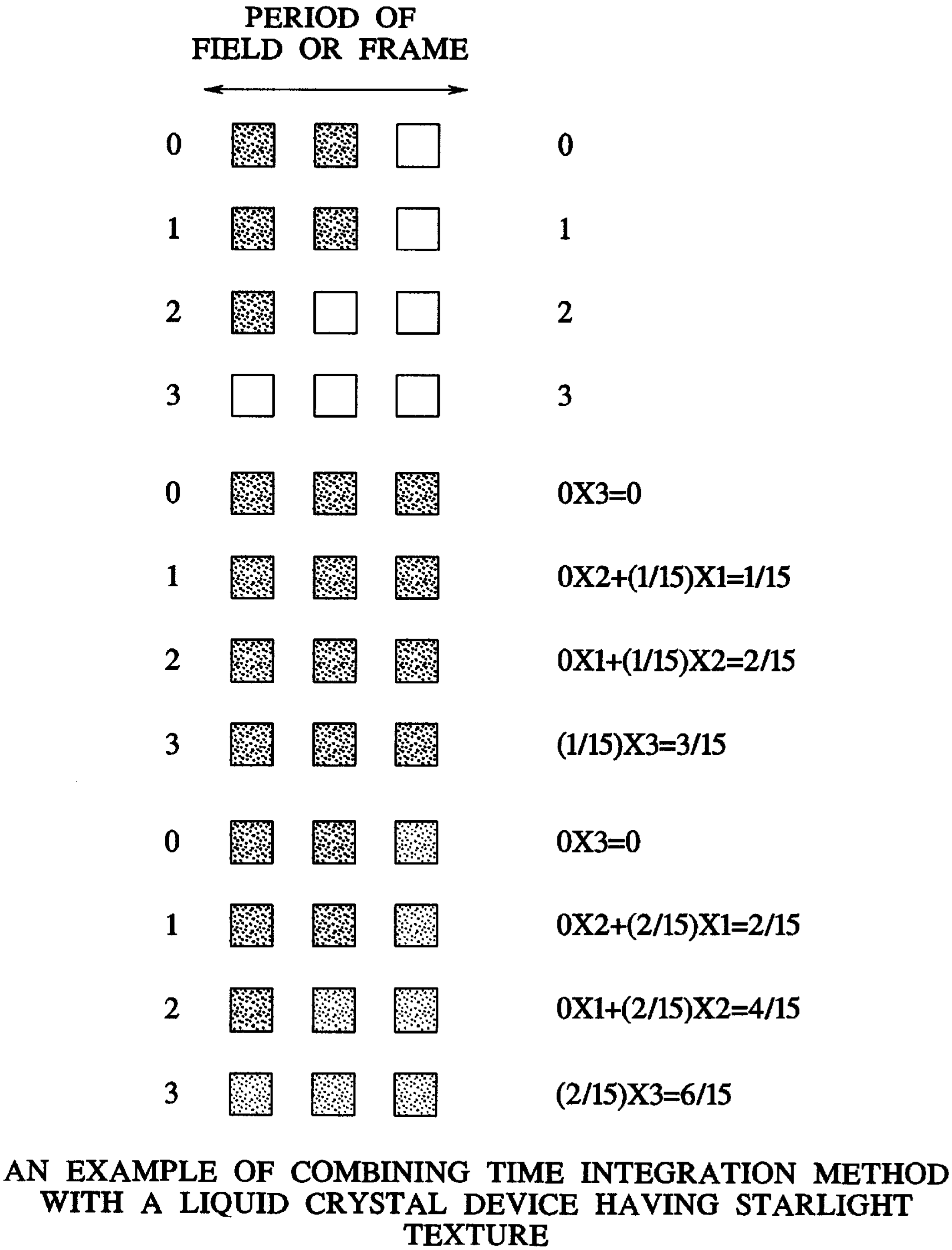
FIG. 19 is a schematically drawn planar view showing a gray scale which is obtained as a result of applying a combination of time integration method and a liquid crystal device exhibiting a starlight texture according to a still other embodiment of the present invention.
Figure 20:
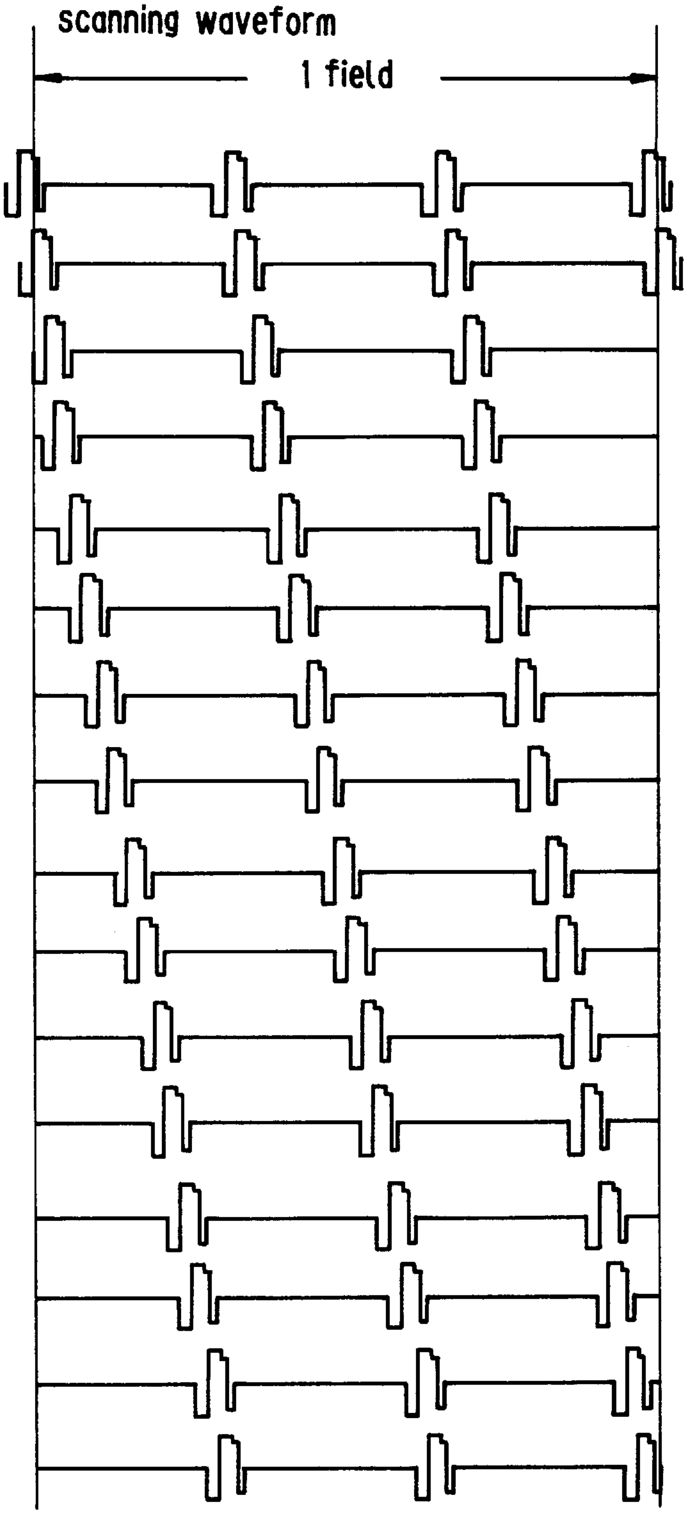
FIG. 20 shows a specific scanning waveform used in a method of driving a liquid crystal device according to an embodiment of the present invention, in which a combination of time integration method and a liquid crystal device exhibiting a starlight texture is used.
Figure 21:
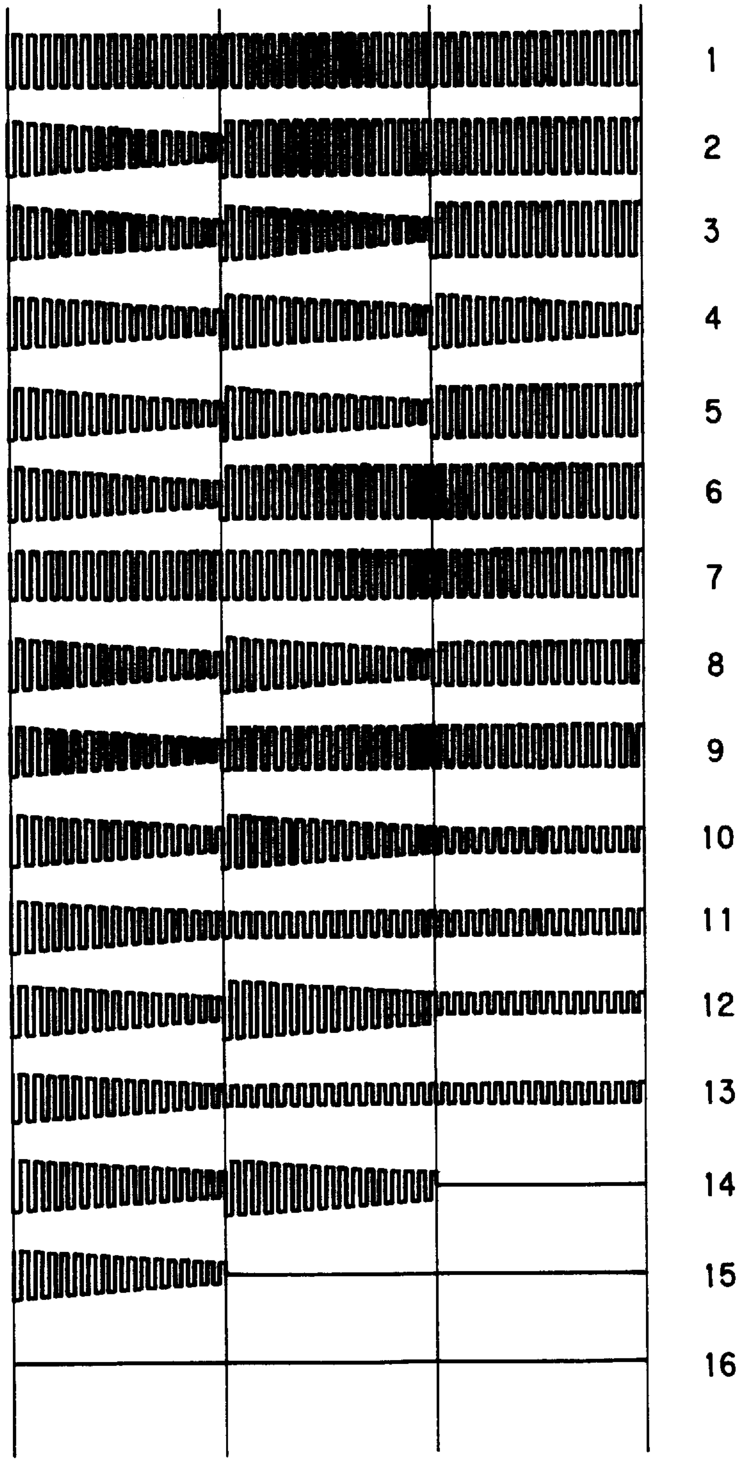
FIG. 21 shows a specific signal (data voltage) waveform used in a method of driving a liquid crystal device according to an embodiment of the present invention, in which a combination of time integration method and a liquid crystal device exhibiting a starlight texture is used.
Figure 22:
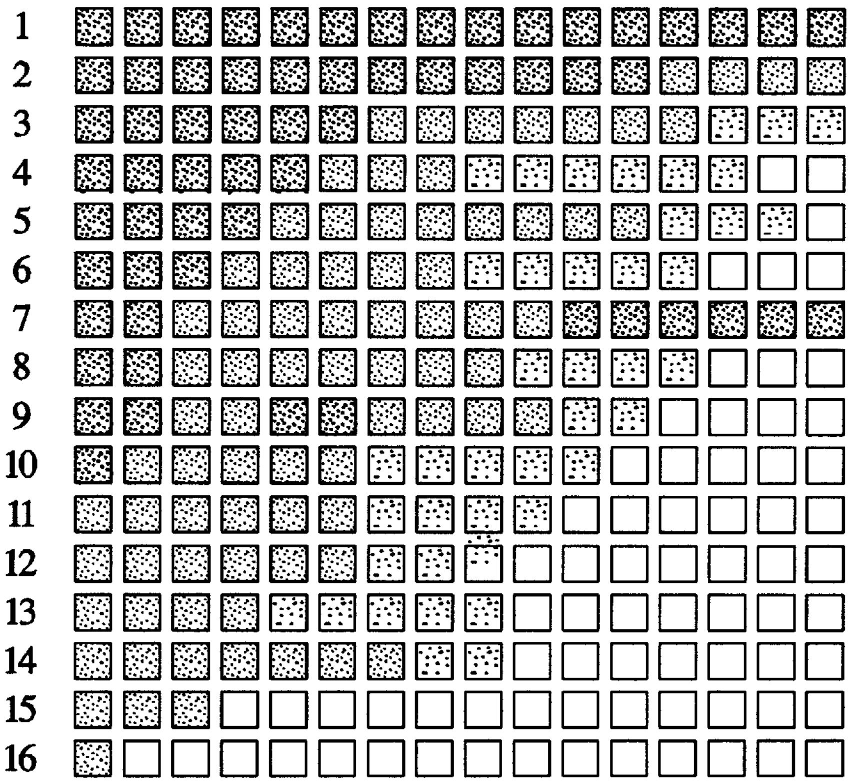
FIG. 22 shows display patterns obtained by a method of driving a liquid crystal device according to an embodiment of the present invention, in which a combination of time integration method and a liquid crystal device exhibiting a starlight texture is used.
Figure 23:
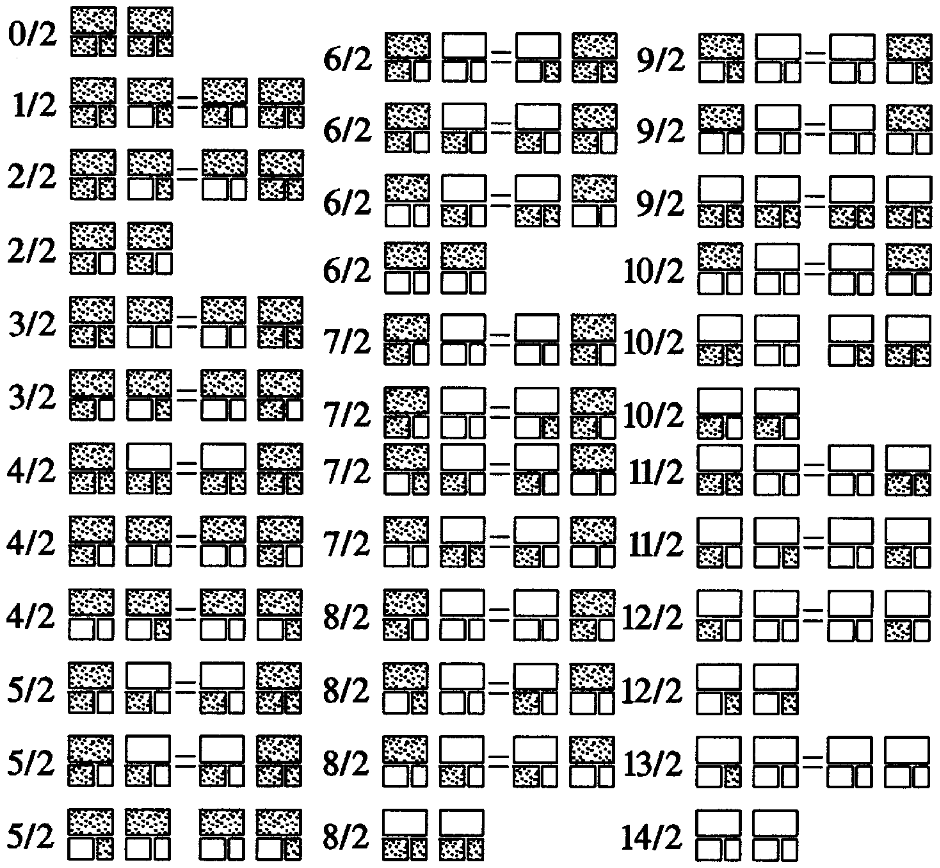
FIG. 23 is a schematically drawn view showing a gray scale which is obtained as a result of dividing a pixel electrode into portions according to a method specified in another embodiment of the present invention.
Figure 24:
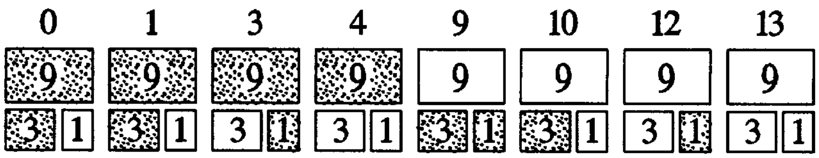
FIG. 24 is a schematically drawn planar view showing a gray scale which is obtained as a result of dividing a pixel electrode into portions according to another method specified in an embodiment of the present invention.

In case a 16×16-matrix panel which exhibits a starlight texture as described hereinbefore in Example 1, 16 gray levels can be obtained on each of the pixels by a single line addressing. Thus, referring to FIG. 19, a resolution of $(1/15)\times(1/3)=1/45$, or a gray level of 46, results by line addressing for three times. The specific drive waveforms applied in this case are shown in FIGS. 20 and 21. The display obtained on the 16×16-matrix panel using the waveforms above is shown in FIG. 22. It can be seen that a multiple gray-scale level display having a gray level of over 16 is obtained by the present example.

the pixel into areas at a ratio of 1:2:4: . . . :$2^n$. However, it has been found that, when addressing (data writing) is effected for twice or more times per single field, the number of gray scale levels cannot be effectively increased. Referring to FIG. 23, more specifically, the multiplicity of the bright levels increases as to result in a number of gray scale levels of only 15.

Figure 25:
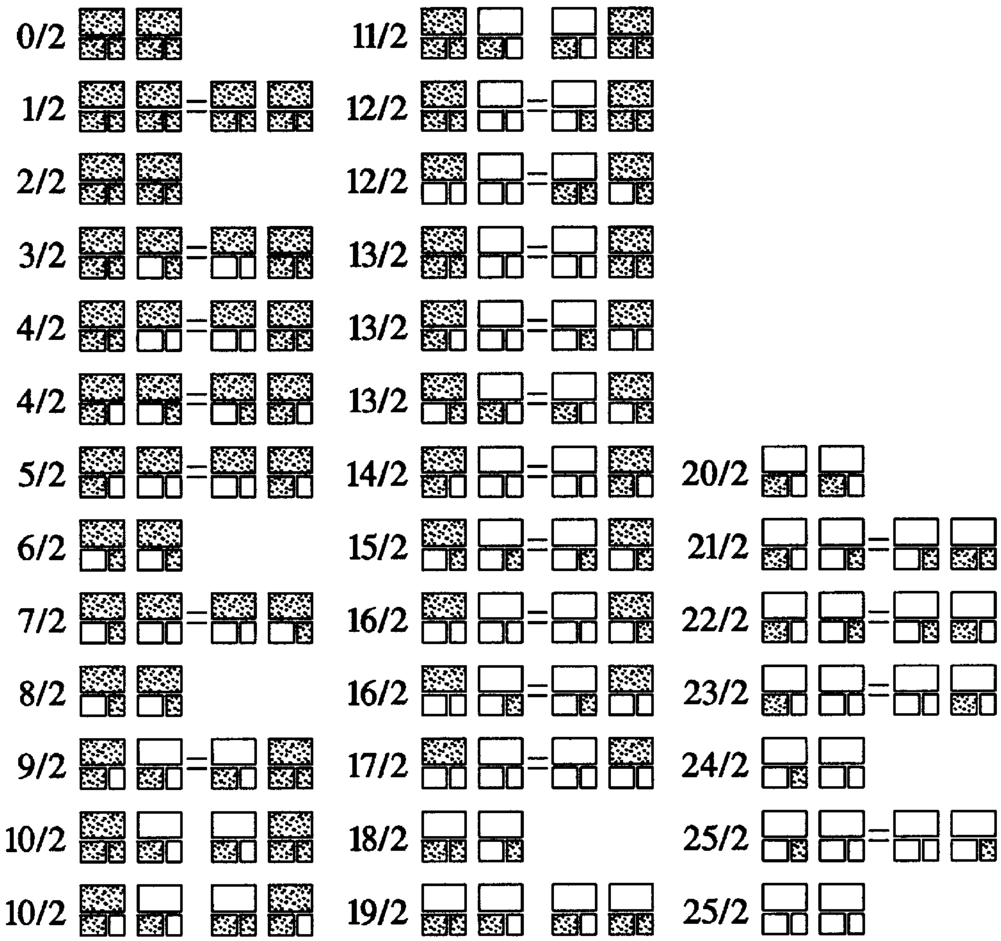
FIG. 25 is a schematically drawn view showing a gray scale which is obtained as a result of combining the method of dividing a pixel electrode into portions with a time integration method, in accordance with a method specified in a still other embodiment of the present invention.

However, when the electrode is divided into portions having an area ratio in the series of $3^n$, eight gray scale levels can be obtained. Although a linear gray scale level is not obtained, the multiplicity as described above with reference to FIG. 23 can be reduced to obtain a linear gray level of, for example, $3^n$=27, as shown in FIG. 25. This can be achieved by employing the time integration method and rewriting the pixels twice per single field.

A pixel electrode can be divided into portions having the optimal area ratio once the number of division of an electrode and the repetition times in the time integration method are given. Thus, the optimal ratio in dividing the pixel electrode into areas is given in Table 1 below. In the table, the repetition times of addressing is given per single field or single frame.

TABLE 1

Combined Gray-level Method Comprising Area and Time Integration Methods

| | Number of Dividing the Pixel Electrode | | | | | | | |
|---|---|---|---|---|---|---|---|---|
| | 1 | | 2 | | 3 | | n | |
| Times of Addressing | Pixel Electrode Area Ratio | Number of Gray Levels | Pixel Electrode Area Ratio | Number of Gray Levels | Pixel Electrode Area Ratio | Number of Gray Levels | Pixel Electrode Area Ratio | Number of Gray Levels |
| 1 | 1 | 2 | 1:2 | 4 | 1:2:4 | 8 | 1:2:4: . . . :$2^{n-1}$ | $2^n$ |
| 2 | 1 | 3 | 1:3 | 9 | 1:3:9 | 27 | 1:3:9: . . . :$3^{n-1}$ | $3^n$ |
| 3 | 1 | 4 | 1:4 | 16 | 1:4:16 | 64 | 1:4:16: . . . :$4^{n-1}$ | $4^n$ |
| 4 | 1 | 5 | 1:5 | 25 | 1:5:25 | 125 | 1:5:25: . . . :$5^{n-1}$ | $5^n$ |
| . | | | | | | | | |
| . | | | | | | | | |
| . | | | | | | | | |
| m | 1 | m + 1 | 1:(m + 1) | $(m + 1)^2$ | 1:m + 1: $(m + 1)^1$ | $(m + 1)^3$ | 1: . . . :$(m + 1)^{n-1}$ | $(m + 1)^n$ |

EXAMPLE 4

A process for driving a liquid crystal device by a gray-scale control method comprising a combination of the pixel electrode division method and the time integration method above is described below.

Considering that the area multi-gray-level method above, it is still insufficient in the number of gray scale levels. In case of the time integration method, it yields multiple combinations whose levels are not distinguished from each other due to the time-averaged nature of the method. Thus, the increase in the number of gray-scale levels is not effectively utilized in the display. Furthermore, the time integration method requires liquid crystal having quick response at too great an expense.

Accordingly, the present example provides a drive method in which the aforementioned area multi-gray-level method is combined with the time integration method in the following manner. In an optimal combination, it was found possible to increase the number of gray levels up to 27.

It is known that a gray scale display can be obtained in a single addressing (data writing) per single field by dividing It can be read from Table 1 above that a maximum number of gray scale levels can be obtained by combining the area multi-gray-level method and the time integration method. More specifically, when addressing (data writing) is effected for m times per single field or frame in a case the pixel electrode is divided into n portions, the area ratio of the divided portions in a pixel electrode can be obtained as $1:(m+1):(m+1)^2: \ldots :(m+1)^{n-1}$. Thus, $(m+1)^n$ gray levels can be obtained by dividing the pixel electrodes into portions having an area ratio in a series of $(m+1)^{n-1}$ (where, n represents a positive integer). Reference can be made to Example 7 which is described hereinafter.

EXAMPLE 5

A process for driving a liquid crystal device by a gray-scale control method comprising a combination of the method of providing gray scale within a pixel and the time integration method above is described below.

In the present example, the aforementioned method of providing gray scale within single pixel (i.e., pulse voltage modulation method) is combined with the time integration method. The present method is applied to a liquid crystal device whose transmittance per single pixel is controlled by finely adjusting the ratio of black and white portions using voltage modulation; more specifically, to a liquid crystal device which exhibits a starlight texture. Thus, a multiple gray-scale level display as shown in Table 2 can be implemented by using the transmittance levels corresponding to the area ratio employed in the conventional area multi-gray-level method.

More specifically, the number of divided portions in a pixel electrode in Table 1 can be interpreted as the number defining the of gray levels per pixel, n, and the area ratio of the pixel electrode in Table 1 can be considered as transmittance ratio. The combined method of the present example can be specifically defined in this manner.

In other words, gray level display can be realized by determining the repetition times of addressing, m, and the number n which defines the gray levels within a single pixel, thereby controlling the transmittance to yield a ratio of $1:(m+1):(m+1)^2: \ldots :(m+1)^{n-1}$.

TABLE 2(A)

Combined Gray-level Method Comprising Voltage Modulation and Time Integration Methods Maximum integer n satisfying (linear gray level per pixel) $\geqq (m + 1)^{n-1} + 1$ or Maximum integer n satisfying (non-linear gray level per pixel) $\geqq n + 1$

| | 1 | | 2 | | 3 | | n | |
|---|---|---|---|---|---|---|---|---|
| Times of Addressing | Ratio of Transmittance | Number of Gray Levels | Ratio of Transmittance | Number of Gray Levels | Ratio of Transmittance | Number of Gray Levels | Ratio of Transmittance | Number of Gray Levels |
| 1 | 1 | 2 | 1:2 | 4 | 1:2:4 | 8 | $1:2:4: \ldots :2^{n-1}$ | $2^n$ |
| 2 | 1 | 3 | 1:3 | 9 | 1:3:9 | 27 | $1:3:9: \ldots :3^{n-1}$ | $3^n$ |
| 3 | 1 | 4 | 1:4 | 16 | 1:4:16 | 64 | $1:4:16: \ldots :4^{n-1}$ | $4^n$ |
| 4 | 1 | 5 | 1:5 | 25 | 1:5:25 | 125 | $1:5:25: \ldots :5^{n-1}$ | $5^n$ |
| 5 | 1 | 6 | 1:6 | 36 | 1:6:36 | 216 | $1:6:36: \ldots :6^{n-1}$ | $6^n$ |
| 6 | 1 | 7 | 1:7 | 49 | 1:7:49 | 343 | $1:7:49: \ldots :7^{n-1}$ | $7^n$ |
| 7 | 1 | 8 | 1:8 | 64 | 1:8:64 | 512 | $1:8:64: \ldots :8^{n-1}$ | $8^n$ |
| . | | | | | | | | |
| . | | | | | | | | |
| . | | | | | | | | |
| m | 1 | m + 1 | 1:(m + 1) | $(m + 1)^2$ | $1:m + 1: (m + 1)^2$ | $(m + 1)^3$ | $1: \ldots :(m + 1)^{n-1}$ | $(m + 1)^n$ |

TABLE 2(B)

Combined Gray-level Method Comprising Voltage Modulation and Time Integration Methods Maximum integer n satisfying (linear gray level per pixel) $\geqq (m + 1)^{n-1} + 1$ or Maximum integer n satisfying (non-linear gray level per pixel) $\geqq n + 1$

| | 4 | | 5 | | n | |
|---|---|---|---|---|---|---|
| Times of Addressing | Ratio of Transmittance | Number of Gray Levels | Ratio of Transmittance | Number of Gray Levels | Ratio of Transmittance | Number of Gray Levels |
| 1 | 1:2:4:8 | 16 | 1:2:4:8:16 | 36 | $1:2:4: \ldots :2^{n-1}$ | $2^n$ |
| 2 | 1:3:9:27 | 81 | 1:3:9:27:81 | 243 | $71:3:9: \ldots :3^{n-1}$ | $3^n$ |
| 3 | 1:4:16:64 | 256 | 1:4:16:64:256 | 1024 | $1:4:16: \ldots :4^{n-1}$ | $4^n$ |
| 4 | 1:5:25:125 | 625 | 1:5:25:125:625 | 3125 | $1:5:25: \ldots :5^{n-1}$ | $5^n$ |
| 5 | 1:6:36:216 | 1296 | 1:6:36:216: 1296 | 7776 | $1:6:36: \ldots :6^{n-1}$ | $6^n$ |
| 6 | 1:7:49:343 | | 1:7:49:343 | | $1:7:49: \ldots :7^{n-1}$ | $7^n$ |
| 7 | 1:8:64:512 | | 1:8:64:512 | | $1:8:64: \ldots :8^{n-1}$ | $8^n$ |
| . | | | | | | |
| . | | | | | | |
| . | | | | | | |
| m | $1:(m + 1): \ldots : (m + 1)^3$ | $(m + 1)^4$ | $1:m + 1: \ldots : (m + 1)^4$ | $(m + 1)^5$ | $1: \ldots :(m + 1)^{n-1}$ | $(m + 1)^n$ |

Figure 30:
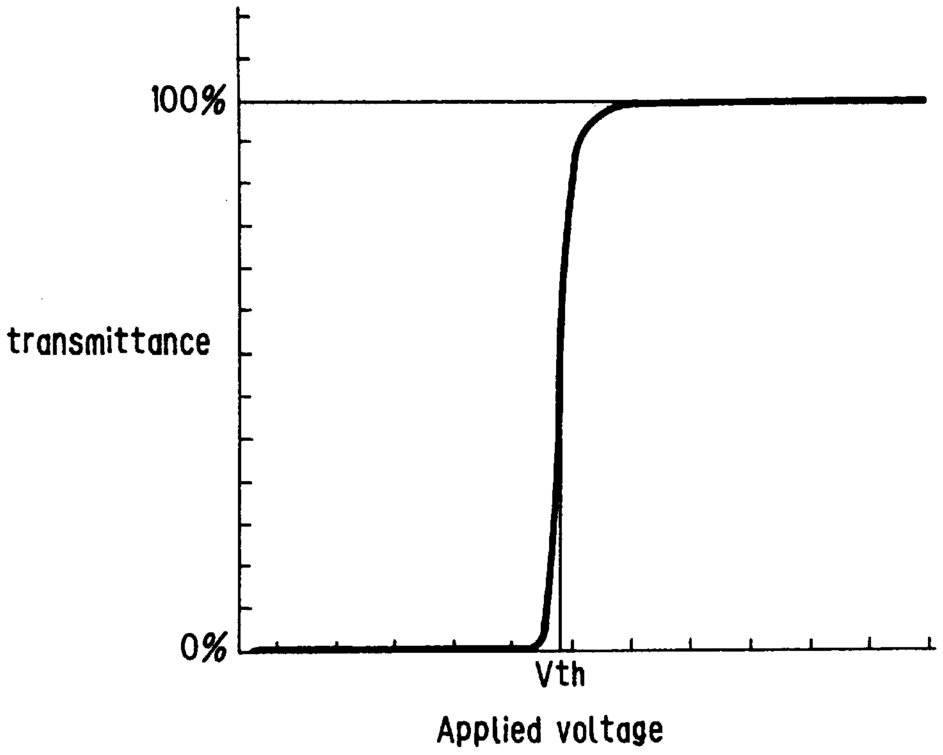
FIG. 30 is a graph in which a transmittance vs. applied voltage curve is given, showing the threshold voltage characteristics of a conventional liquid crystal display device.

In case a conventional ferroelectric liquid crystal material whose characteristic steep transmittance vs. voltage curve is shown in FIG. 30 is utilized in the present multi-gray-level display method, single pixel exhibits a two-level gray scale display. Thus is obtained a case of n=1 in Table 2 (A). A constant gray level display can be obtained, however; a two-gray level display results by addressing once, a three-gray level display can be obtained by addressing twice, and a four-gray level display can be achieved by addressing three times.

EXAMPLE 6

A process for driving a liquid crystal device by a gray-scale control method comprising a combination of the method of providing gray scale within a pixel and the pixel electrode division method above is described below. The present method comprises pixels divided into portions differed in area and each having multiple gray levels generated within a single electrode by voltage modulation.

More specifically, a display having multiple gray-levels as shown in Table 3 can be generated by a simple interpretation of the repetition times of addressing in Table 1 into the gray-scale levels within a single electrode. For instance, in case of effecting a 16-gray level control per single pixel on a liquid crystal device exhibiting a starlight texture, it can be readily understood that 256 gray levels can be realized by dividing the pixel into two portions, and that 4096 gray levels are obtained by dividing the pixel into three portions. Even if the margin of drive control should be taken into account, 100 gray levels are obtained in a 10-gray-level control of a single pixel by dividing the pixel electrode into two portions, and 1,000 gray levels are realized in case of dividing the pixel electrode into three portions.

Figure 26:
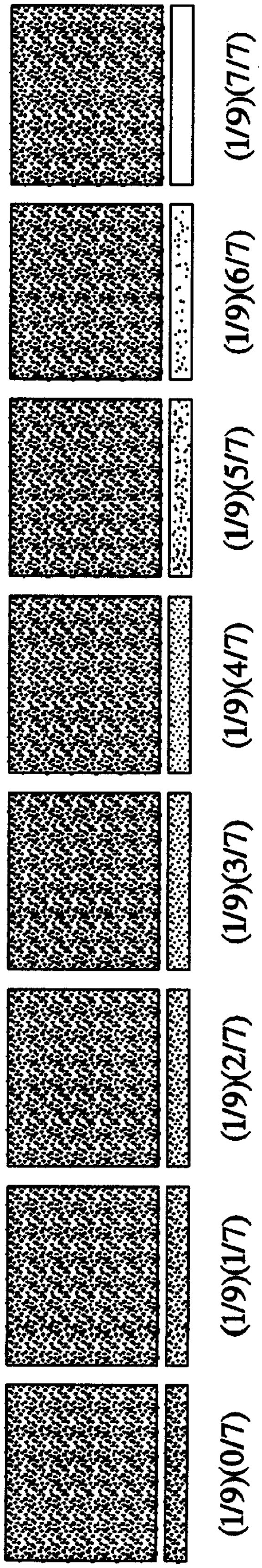
FIG. 26 is a schematically drawn planar view showing a gray scale which is obtained as a result of combining the method of pixel modulation (pulse voltage modulation) for a pixel electrode with a method of dividing a pixel electrode into portions, in accordance with a method specified in a yet other embodiment of the present invention.

Furthermore, in case of controlling a single pixel in 8 gray levels with a drive margin taking into consideration, 64 gray levels are achieved by dividing the pixel electrodes into two portions at an area ratio of 8:1, and even 512 gray levels can be realized by dividing the pixel electrode into three portions. A part of the 64 gray levels achieved in the former case is illustrated in FIG. 26. In controlling a single pixel in 6 gray levels with a drive margin taking into consideration, 36 gray levels are achieved by dividing the pixel electrodes into two portions, and 216 gray levels can be realized by dividing the pixel electrode into three portions.

In general, by dividing the pixel electrodes into portions at an area ratio in the series of $l^{n-1}$, $l^n$ gray levels (where l represents the gray levels within a single pixel and n, the number of divided portions of a pixel electrode) can be obtained even when addressing is effected only once.

TABLE 3

Combined Gray-level Method Comprising Area and Multi-Gray-Level (Pulse Voltage or Pulse Width Modulation) Methods

| | Number of Dividing the Pixel Electrode | | | | | | | |
|---|---|---|---|---|---|---|---|---|
| | 1 | | 2 | | 3 | | n | |
| Gray Levels in a Pixel | Pixel Electrode Area Ratio | Number of Gray Levels | Pixel Electrode Area Ratio | Number of Gray Levels | Pixel Electrode Area Ratio | Number of Gray Levels | Pixel Electrode Area Ratio | Number of Gray Levels |
| 2 | 1 | 2 | 1:2 | 4 | 1:2:4 | 8 | 1:2:4: . . . :$2^{n-1}$ | $2^n$ |
| 3 | 1 | 3 | 1:3 | 9 | 1:3:9 | 27 | 1:3:9: . . . :$3^{n-1}$ | $3^n$ |
| 4 | 1 | 4 | 1:4 | 16 | 1:4:16 | 64 | 1:4:16: . . . :$4^{n-1}$ | $4^n$ |
| 5 | 1 | 5 | 1:5 | 25 | 1:5:25 | 125 | 1:5:25: . . . :$5^{n-1}$ | $5^n$ |
| 6 | 1 | 6 | 1:6 | 36 | 1:6:36 | 216 | 1:6:36: . . . :$6^{n-1}$ | $6^n$ |
| 7 | 1 | 7 | 1:7 | 49 | 1:7:49 | 343 | 1:7:49: . . . :$7^{n-1}$ | $7^n$ |
| 8 | 1 | 8 | 1:8 | 64 | 1:8:64 | 512 | 1:8:64: . . . :$8^{n-1}$ | $8^n$ |
| . | | | | | | | | |
| . | | | | | | | | |
| 16 | 1 | 16 | 1:16 | 256 | 1:16:256 | 4096 | 1:16: . . . :$16^{n-1}$ | $16^n$ |
| l | 1 | l | 1:l | $l^2$ | 1:l:$l^2$ | $l^3$ | 1:l:$l^2$: . . . :$l^{n-1}$ | $l^n$ |

In case a conventional ferroelectric liquid crystal material whose characteristic steep transmittance vs. voltage curve is shown in FIG. 30 is utilized in the present multi-gray-level display method, predetermined gray levels of 4, 8, and 16 can be obtained by dividing the pixels into 2, 3, and 4 portions, respectively, because the use of a conventional ferroelectric liquid crystal corresponds to a case of with gray levels in a pixel of l=2.

EXAMPLE 7

A process for driving a liquid crystal device by a gray-scale control method comprising a combination of the method of providing gray scale within a pixel with the time integration and the pixel electrode division methods above is described below. According to the present method, both the increase in gray levels as in the case described in Example 6, and that attributed to the time integration method as described in Examples 4 and 5 can be obtained (reference can be made to Table 4 below).

More specifically, a combination of a gray-level display obtained by the method obtained by combining the time integration method with the methods of providing multiple gray levels within a pixel and pixel electrode division can be presumed. For instance, by providing 8 gray levels to a single pixel while dividing the electrode into 3 portions, linear gray levels with 512 levels can be easily assumed from the foregoing Table 3. Thus, the maximum integer n which satisfies the relation: (linear gray levels)≧$[(m+1)^{n-1}+1]$ is found to be n=6, and hence, 729 (corresponding to $3^6$) gray levels are obtained by repeating the addressing for two times.

It can be read also from Table 3 that a linear gray scale display with 64 gray levels is obtained by dividing the electrode into two portions and setting 8 gray levels per pixel. It can be readily understood that n=4 is the maximum integer which satisfies the relation (linear gray levels)≧[(m+1)$^{n-1}$1]. Thus, 81 gray levels corresponding to $3^4$ can be achieved by repeating the addressing twice, and 256 gray levels corresponding to $4^4$ can be realized by repeating the addressing thrice.

TABLE 4

Combined Gray-level Method Comprising Area and Multi-Gray-Level (Pulse Voltage or Pulse Width Modulation) Methods

| | Number of Dividing the Pixel Electrode | | | | | | | | | |
|---|---|---|---|---|---|---|---|---|---|---|
| | 1 | | 2 | | 3 | | 4 | | n | |
| Times of Addressing | Ratio of Transmittance | Number of Gray Levels | Ratio of Transmittance | Number of Gray Levels | Ratio of Transmittance | Number of Gray Levels | Ratio of Transmittance | Number of Gray Levels | Ratio of Transmittance | Number of Gray Levels |
| 1 | 1 | 2 | 1:2 | 4 | 1:2:4 | 8 | 1:2:4:8 | 8 | 1:2:4: . . . :$2^{n-1}$ | $2^n$ |
| 2 | 1 | 3 | 1:3 | 9 | 1:3:9 | 27 | 1:3:9:27 | 27 | 1:3:9: . . . :$3^{n-1}$ | $3^n$ |
| 3 | 1 | 4 | 1:4 | 16 | 1:4:16 | 64 | 1:4:16:64 | 64 | 1:4:16: . . . :$4^{n-1}$ | $4^n$ |
| 4 | 1 | 5 | 1:5 | 25 | 1:5:25 | 125 | 1:5:25:125 | 125 | 1:5:25: . . . :$5^{n-1}$ | $5^n$ |
| . | | | | | | | | | | |
| . | | | | | | | | | | |
| . | | | | | | | | | | |
| m | 1 | m + 1 | 1:(m + 1) | $(m + 1)^2$ | 1:m + 1: $(m + 1)^2$ | $(m + 1)^3$ | 1:(m + 1): $(m + 1)^2$: $(m + 1)^3$ | $(m + 1)^4$ | 1: . . . :$(m + 1)^{n-1}$ | $(m + 1)^n$ |

In case a conventional ferroelectric liquid crystal material whose characteristic steep transmittance vs. voltage curve is shown in FIG. 30 is utilized in the present multi-gray-level display method, a black-and-white two-gray level pixel results due to the steep threshold characteristics. The integers n in Table 4 corresponds to the number of divided portions per pixel electrode. Thus, constant gray levels can be obtained by dividing the pixel electrode into 3 portions (n=3); i.e., predetermined gray levels of 8, 27, and 64 can be obtained by addressing once, twice, and thrice, respectively.

EXAMPLE 8

A color display device was implemented by combining the pixels of the aforementioned passive matrix liquid crystal displays driven according to the combined multi-gray-level methods with each of the R, G, and B color filters.

EXAMPLE 9

A full color display device was easily implemented by using a passive matrix addressed liquid crystal display above driven according to the aforementioned combined multi-gray-level methods. More specifically, the R, G, and B backlights were each switched at least once within a field or a frame of the panel having no color filters, thereby easily implementing a full color display device.

COMPARATIVE EXAMPLE

An FLC display device was fabricated following the process disclosed in JP-A-3-276126 referred above.

A 40×25-mm$^2$ glass plate 3 mm in thickness equipped with an ITO transparent electrode was coated with a 500 Å thick polyimide JALS-246 (a product of Japan Synthetic Rubber Co., Ltd.) by spin coating. The ITO transparent electrode had an area resistivity of 100 Ω/cm$^2$, and was provided at a thickness of 500 Å. The spin coating was effected at a revolution of 300 rpm for a duration of 3 seconds, and then, at 3,000 rpm for a duration of 30 seconds.

The glass substrate coated with polyimide thus obtained was subjected to rubbing treatment for three times by using a rubbing apparatus equipped with a roller having thereon a Rayon cloth fixed around it. Rubbing was effected by pressing the brush against the polyimide-coated glass substrate to a depth of 0.15 mm, and running the roller at a speed of 94 rpm while feeding the stage at a rate of 5 cm/min.

Alumina grains 0.5 μm in diameter were scattered on the substrate using a spacer distributer machine manufactured by Sonocom Co., Ltd. Thus were the alumina spacers distributed on the substrate at a density of 300 grains per 1-mm$^2$ area. If the spacers were to be scattered at a higher density, they would undergo agglomeration to yield an unfavorable result. Further-more, 2-μm diameter spacers were scattered at a density of 25 grains per 1-mm$^2$ area using the same machine.

Structbond (a product of Mitsui Toatsu ChemicaLs, Inc.) was then applied as a sealing agent to the peripheral portion of the other glass substrate. The coating was effected using a screen printing machine. The resulting two substrates were then aligned, and a pressure of 1 kg/cm$^2$ was applied uniformly to obtain a cell having a constant gap of 1.7 μm. Two types of cells were prepared; one had the alignment directions arranged in parallel with each other, and the other had the alignment directions reversed with respect to each other. The thus assembled cells were placed inside a fan heater at 180° C. for a duration of 2 hours to solidify the sealing agent. The gap of the cell was measured using a cell gap measuring apparatus manufactured by Otsuka Denshi Co., Ltd. to find that the gap is controlled over the entire cell at 1.7 μm±0.1 μm.

A ferroelectric liquid crystal composition, ZLI-3775, a product of Merck & Co., Inc., was evacuated to vacuum at 80° C., and then injected into the cell under vacuum after heating it to 110° C., a temperature in the isotropic temperature range. The total process using the ferroelectric liquid crystal composition was effected over a duration of 1.5 hours. Then, the resulting cell was cooled to room temperature, and was inserted between two crossed polarizers. The molecular orientation of the liquid crystal was observed under a microscope, and the electrooptical properties thereof were measured.

Figure 27A:
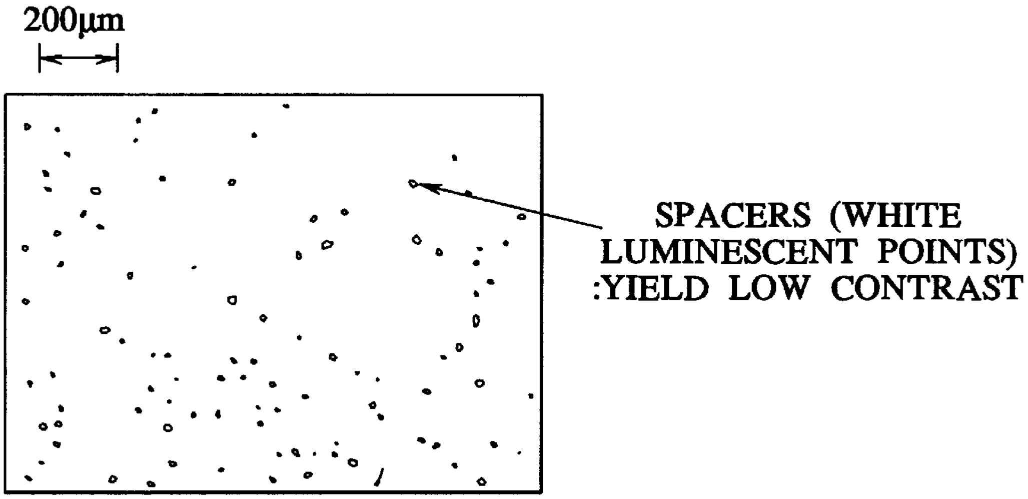
FIGS. 27A and 27B are schematically drawn diagrams provided as a means for explaining the light-transmitting state of a comparative liquid crystal devices

In a cell having a parallel alignment, the molecular orientation of the liquid crystal was found to cause optical leakage around the spacers as shown in FIG. 27A even when the entire cell was brought into a dark state. The optical leakage induced the drop in black level, thereby impairing the global contrast of the cell.

Considering that a display using a ferroelectric liquid crystal is utilized in a birefringence mode, the cell gap must be strictly controlled to a uniform and optimal value. However, in the vicinity of the portions to which alumina spacers 0.5 μm in diameter are scattered, the spacers greatly displace the substrates to provide a cell gap modified from the optimal value. Thus, an obvious color unevenness was observed. Needless to say, a low-quality display results from such an uneven coloring. The uneven coloring is believed to occur due to the size of the spacers that is significantly larger than the wavelength of a visible light. Furthermore, an increase in the density of the scattered spacers is also unfavorable from the viewpoint of impairing the contrast due to the light leakage which occurs around the spacers.

However, as mentioned in the foregoing, the starlight texture according to the present invention is obtained as a consequence of fine grains scattered over the entire cell. Thus, the optical leakage can be reduced, and an effective electric field distribution ascribed to the distribution of the dielectric constant can be obtained without impairing the alignment of liquid crystal.

In contrast to the case above in which the alignment is provided in parallel with each other, a cell having the alignments reversed with respect to each other yielded fine stripes in the order of micrometers along the direction of the alignment treatment. Leakage of light was observed around the spacers even in the normally black state. Thus, the cell was found to yield a defective black level which is the principal reason for impairing the contrast of the cell. Furthermore, numerous defects, assumably the principal cause of the light leakage, were observed around the spacers.

The electrooptical effects of the two types of cells fabricated above were observed. With respect to the cell having their alignments arranged in parallel with each other, a bipolar reset pulse having a width of 1 msec was applied first at a voltage of 30 V. Then, by applying signal pulses at a width of 1 msec, the voltage was changed from 1 V to 30 V to observe the change in transmittance of the cell. In this manner, the cell was studied whether the electrooptical effects thereof were different from those of a conventional bistable ferroelectric liquid crystal.

Figure 27B:
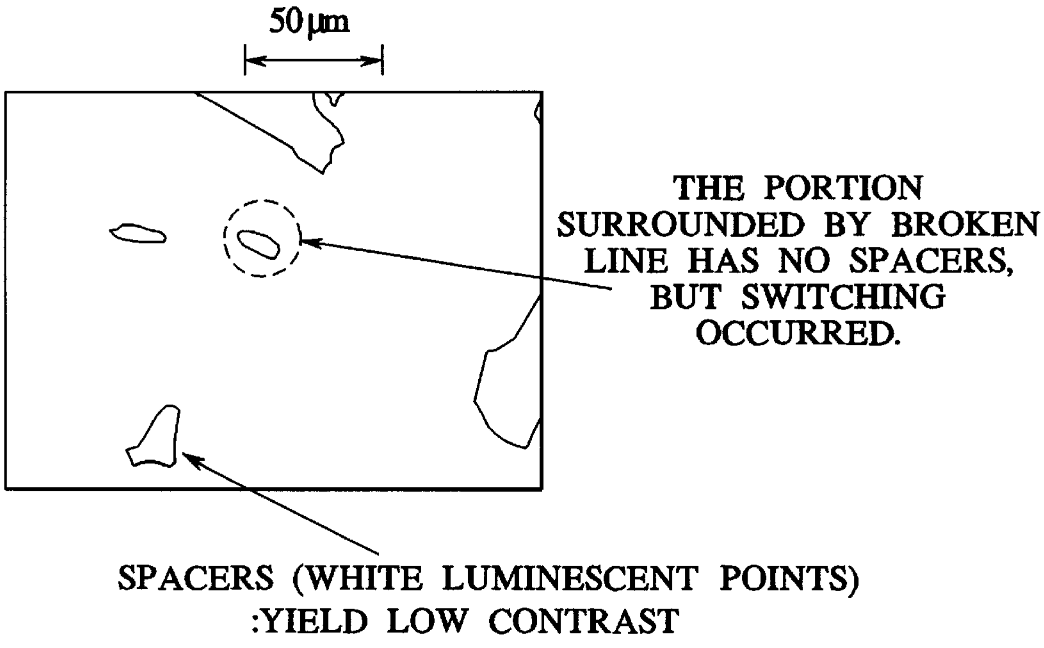
Figure 28:
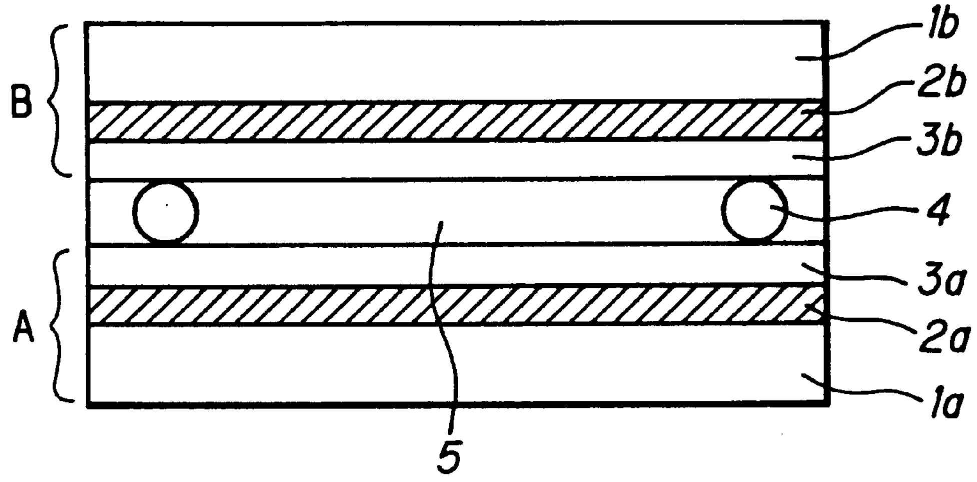
FIG. 28 is a schematically drawn cross section view of a conventional liquid crystal device.
Figure 29:
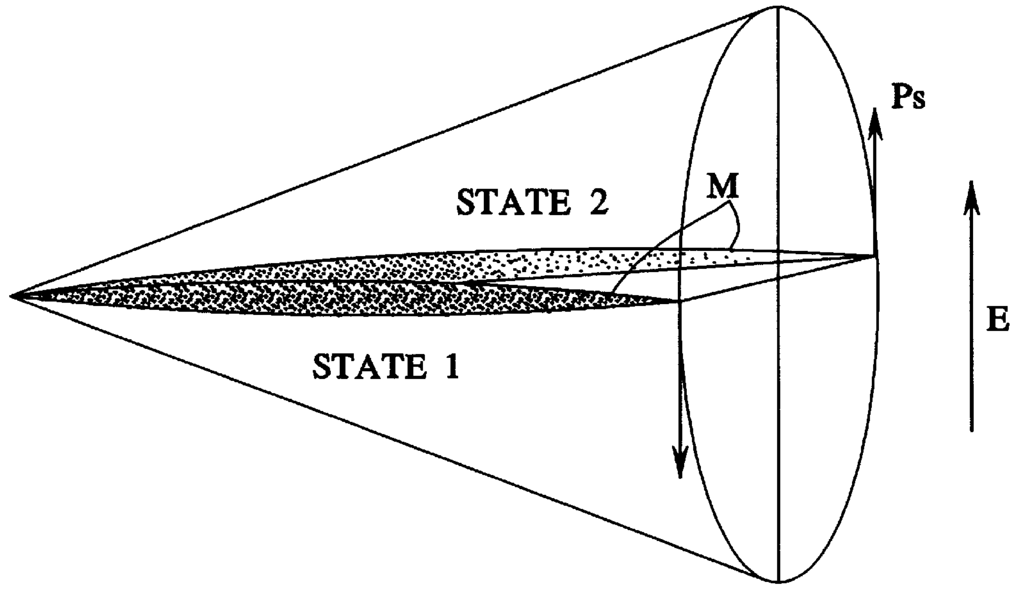
FIG. 29 is a schemcatically drawn model structure of a ferroelectric liquid crystal.

With increasing voltage, the liquid crystal molecules under the microscope were not observed to start moving from the upper portion of the spacer. The molecular alignment of the liquid crystal in the upper portion of the spacers was never observed to be uniform, but was found disordered. Accordingly, bright spots were observed on normally black display, and black spots were observed similarly on normally white display. At any rate, the resulting display suffers poor contrast as illustrated in FIG. 27B.

Concerning switching, i.e., the key of the technology, it was observed to occur sometimes from the spacer portions (or the vicinity thereof), and in other cases, from the other portions. In short, the switching does not necessarily take place from the spacer portions or from the vicinity thereof.

More importantly, the domain expands with the occurrence of switching. If the expansion should yield a threshold voltage over a certain range, the switching voltage should also range over a certain width. In fact, however, no considerable expansion in threshold voltage was observed as compared with that of a conventional system. That is, the threshold voltage in the present system was found to range over a width of 1 V. Furthermore, the voltage was varied in a DC-like manner to study the change in the switching domains. As a result, typical boat-type domains with occasional zigzag defects on cell edges were observed. It was therefore concluded that the system has a chevron layer structure. The switching characteristics were similar to those of the conventional cells, except that the switching sometimes occurs from the spacer portions and the vicinity thereof. Thus, the resulting product was far from a cell comprising pixels each capable of providing a multi-gray-level display.

Similarly, in a cell having alignments reversed with respect to each other, a bipolar reset pulse having a width of 1 msec was applied first at a voltage of 30 V, and then, by applying signal pulses at a width of 1 msec, the voltage was changed from 1 V to 30 V to observe the change in transmittance of the cell. In this manner, the cell was studied whether the electrooptical effects thereof were different from those of a conventional bistable ferroelectric liquid crystal.

In this case again, the liquid crystal molecules under the microscope were not observed to start moving from the upper portion of the spacer with increasing voltage. Switching was found to take place along the fine stripes generated in the order of micrometers along the direction of rubbing treatment. The molecular alignment of the liquid crystal in the upper portion of the spacers was never observed to be uniform, but was found disordered. At any rate, the resulting display suffers poor contrast as illustrated in FIG. 27.

The scattering density of the spacers was varied to study the influence thereof on the cell characteristics. By experimentation, it was confirmed that the same switching characteristics as those obtained in the case spacers are scattered at a density of 300 spacers/mm$^2$ are obtained so long as the spacers are scattered at a range in density of from 0 to 500 spacers/mm$^2$.

Furthermore, in case of cells whose alignments are arranged in parallel with each other, it was found that the device characteristics of a cell having a gap at a central value of 1.5 μm are exactly the same for those of a cell having a gap at a central value of 1.8 μm. In both cells, the cell gap were controlled to fall within a range of ±0.1 μm of the central value. The device characteristics of the cells having the alignments reversed with respect to each other and having a gap at a central value of 1.5 μm and 1.8 μm were also studied. Results similar to those obtained in the cells having the alignments arranged in parallel with each other were obtained.

Conclusively, by faithfully following the disclosure on the examples described in JP-A-3-276126, it has been found that the display obtained as a result is not effective as a multi-gray-level display described therein. Thus, the technology has been found to be of no practical use.

The present invention was described in detail referring to specific examples above. However, the examples above are not limiting, and they can be modified in various ways so long as the modifications do not depart from the spirit and the scope of the present invention.

For instance, other methods for driving the liquid crystal device can be proposed. A gray-level display per pixel can be realized by modulating the pulse width instead of modulating the pulse voltage. Accordingly, combined methods based on pulse-width modulation method can be schemed. In case of the time integration method, the timing of addressing as well as the number and shape of the divided portions of a pixel electrode can be modified in various ways.

Furthermore, various types of modifications can be applied to not only on the type of the liquid crystal, but also on the material, structure, shape, method of assembly, etc., of the liquid crystal device. Moreover, super-fine grains whose physical properties, types, etc., are varied in various ways can be used for developing fine micro-domains within the liquid crystal. It is also possible to add the super-fine grains in a manner different from that described above, and the super-fine grains can be distributed not only in the liquid crystal, but also on the alignment film or in the alignment film. Furthermore, micro-domains can be formed by, for example, laminating a charge transfer complex such as tetrathiafulvalene-tetra-cyanoquinodimethane.

The present invention was described in detail by making reference to liquid crystal device suitable for display devices because the liquid crystal device according to the present invention provides a multi-gray-scale display. However, the application field of the devices according to the present invention is not only limited to display devices, and are applicable to filters and shutters, display image plane of office automation machines, screens, and phase control devices for use in wobbling. The liquid crystal device according to the present invention yields variable transmittance or contrast ratio in accordance with the applied drive voltage, and hence, it can provide a high performance ever realized to present.

While the invention has been described in detail and with reference to specific embodiments thereof, it will be apparent to one skilled in the art that various changes and modifications can be made therein without departing from the spirit and scope thereof.

What is claimed is:

1. A method of driving a liquid crystal display comprised of a ferroelectric liquid crystal disposed between a pair of substrates, said liquid crystal comprising grains having a diameter of less than 400 nm added to the liquid crystal and finely distributed domains having a range of threshold voltages, said liquid crystal having reversed domains which yield a transmittance of 25% when 300 or more of said domains 2 μm or more in diameter are distributed in a viewing area of 1 $mm^2$, a single domain having a threshold voltage which ranges over 2 volts in correspondence with a change in transmittance of from 10 to 90%, said method comprising the steps of:

applying a modulated data signal to a data electrode in synchronization with application of an addressing signal to a scanning electrode, said data signal having its pulse voltage or pulse width or both of the pulse voltage and pulse width modulated in correspondence with a gray scale of the pixel.

2. A method of driving a liquid crystal display as claimed in claim 1, wherein, a data electrode for a single pixel is divided into a plurality of portions each associated with a different divided area of the pixel, and the application of a combination of data signals corresponding to the gray scale of the pixel to said divided pixel is synchronized with the application of an addressing signal to a scanning electrode.

3. A method of driving a liquid crystal device as claimed in claim 2, wherein, the pixel provides $(m+1)^{n-1}$ gray-scale levels, where n represents a number of pixel portions obtained by dividing a single pixel, and m represents the number of times a line is addressed for a single pixel.

4. A method of driving a liquid crystal device which comprises matrix-addressed driving a liquid crystal device as claimed in claim 1, wherein, a plurality of line addressing steps are repeated for a single pixel within a single frame or single field in correspondence with the gray scale of the pixel.

5. A method of driving a liquid crystal device as claimed in claim 4, wherein, the number of linear gray-scale levels per single pixel is not less than $(m+1)^{n-1}+1$ or the number of non-linear gray-scale levels per single pixel is not less than n+1, where n represents a number of pixel portions obtained by dividing single pixel, and m represents the number of times a line is addressed for a single pixel.

6. A method of driving a liquid crystal device as claimed in claim 1, wherein, a plurality of line addressing steps are repeated per single pixel within a single frame or single field in correspondence with the gray scale of the pixel.

7. A method of driving a liquid crystal device as claimed in claim 6, wherein, said pixel provides $(m+1)^{n-1}$ gray levels, where, n represents a number of pixel portions obtained by dividing a single pixel, and m represents the number of times a step of line addressing is performed for a single pixel within a single frame.

8. A method of driving a liquid crystal device as claimed in claim 6, wherein, the number of linear gray-scale levels per single pixel is not less than $(m+1)^{n-1}+1$ or the number of non-linear gray-scale levels per single pixel is not less than n+1, where n represents a number of pixel portions obtained by dividing a single pixel, and m represents the number of times a line is addressed for a single pixel.

9. The method of driving a liquid crystal display of claim 1, wherein the grains have a diameter of less than 100 nm.

10. The method of driving a liquid crystal display of claim 1, wherein a standard deviation of the grain size is greater than 9.0 nm.

11. The method of driving a liquid crystal display of claim 1, wherein said fine grains comprise carbon black.

12. The method of driving a liquid crystal display of claim 1, wherein said find grains comprise titanium oxide.

13. A liquid crystal device comprising a ferroelectric liquid crystal disposed between a pair of substrates and comprising finely distributed domains having a range of threshold voltages for use in switching said liquid crystal, said liquid crystal having reversed domains which yield a transmittance of 25% when 300 or more of said domains 2 μm or more in diameter are distributed in a viewing area of 1 $mm^2$, a single domain having a threshold voltage which ranges over 2 volts in correspondence with a change in transmittance of from 10 to 90%, wherein, during the application of a data signal to a data electrode, said data signal has its pulse voltage or pulse width or both of the pulse voltage and pulse width modulated in correspondence with the gray scale of the pixel in synchronization with the application of an addressing signal to a scanning electrode.

14. The method of driving a liquid crystal display of claim 13, wherein a standard deviation of a grain size of particles in said liquid crystal is greater than 9.0 nm and said particles are no larger than 100 nm.

15. The liquid crystal device of claim 13, wherein said fine grains comprise carbon black.

16. The liquid crystal device of claim 13, wherein said find grains comprise titanium oxide.

* * * * *